US012654418B2

(12) United States Patent
Weisenberg

(10) Patent No.: US 12,654,418 B2
(45) Date of Patent: Jun. 16, 2026

(54) METHODS FOR INTELLIGENT COMPOSITE RENEWAL SYSTEM FOR STANDALONE, STORAGE, AND RENEWED PIPELINES, INCLUDING FOR REDUCED CARBON EMISSION AND FOR CONVERSION OF IN PLACE PIPELINES FOR CONVEYANCE OF HYDROGEN AND OTHER CLEAN FUELS

(71) Applicant: SAFEGAURD, LLC, Jacksonville, FL (US)

(72) Inventor: Kent Weisenberg, Jacksonville, FL (US)

(73) Assignee: SAFEGAURD, LLC, Jacksonville, FL (US)

( * ) Notice: Subject to any disclaimer, the term of this patent is extended or adjusted under 35 U.S.C. 154(b) by 83 days.

(21) Appl. No.: 18/744,149

(22) Filed: Jun. 14, 2024

(65) Prior Publication Data

US 2024/0336027 A1 Oct. 10, 2024

Related U.S. Application Data

(62) Division of application No. 17/525,594, filed on Nov. 12, 2021, now Pat. No. 12,049,059.

(Continued)

(51) Int. Cl.
*B32B 1/08* (2006.01)
*B29C 63/10* (2006.01)
(Continued)

(52) U.S. Cl.
CPC .............. *B32B 1/08* (2013.01); *B29C 63/105* (2013.01); *B32B 5/022* (2013.01); *B32B 5/266* (2021.05); *B32B 27/12* (2013.01); *B32B*

*27/285* (2013.01); *B32B 27/32* (2013.01); *B32B 27/322* (2013.01); *B32B 27/34* (2013.01); *B32B 27/36* (2013.01); *B32B 27/40* (2013.01); *F16L 9/042* (2013.01); *F16L 9/147* (2013.01); *G01D 11/245* (2013.01); *B29L 2023/22* (2013.01); *B32B 2255/02* (2013.01); *B32B 2255/10* (2013.01); *B32B 2255/205* (2013.01); *B32B 2262/0253* (2013.01); *B32B 2262/0269* (2013.01); *B32B 2262/101* (2013.01); *B32B 2262/106* (2013.01); *B32B 2272/00* (2013.01); *B32B 2307/3065* (2013.01); *B32B 2307/712* (2013.01); *B32B 2307/73* (2013.01); *B32B 2597/00* (2013.01); *C23C 24/04* (2013.01)

(58) Field of Classification Search
CPC ........... B32B 1/08; B32B 5/266; B32B 5/022; B32B 27/12; B32B 27/285; B32B 27/32; B32B 27/322; B32B 27/34; B32B 27/36; B32B 27/40; B29C 63/105; F16L 9/042; F16L 9/147; G01D 11/245
USPC ........................................................ 138/103
See application file for complete search history.

(56) References Cited

U.S. PATENT DOCUMENTS

| | | | |
|---|---|---|---|
| 5,072,622 A | 12/1991 | Roach | |
| 5,395,472 A | 3/1995 | Mandich | |

(Continued)

*Primary Examiner* — David R Deal
(74) *Attorney, Agent, or Firm* — TROUTMAN PEPPER LOCKE LLP; Dustin B. Weeks

(57) ABSTRACT

Methods and manufactures disclosed herein generally relate to a tubular composite (TCS) structure composed of multiple layers of sealing, reinforcement, sensing, protection and interspatial injected materials.

19 Claims, 9 Drawing Sheets

Related U.S. Application Data

(60) Provisional application No. 63/232,355, filed on Aug. 12, 2021, provisional application No. 63/144,138, filed on Feb. 1, 2021, provisional application No. 63/112,711, filed on Nov. 12, 2020.

(51) Int. Cl.

| | |
|---|---|
| B32B 5/02 | (2006.01) |
| B32B 5/26 | (2006.01) |
| B32B 27/12 | (2006.01) |
| B32B 27/28 | (2006.01) |
| B32B 27/32 | (2006.01) |
| B32B 27/34 | (2006.01) |
| B32B 27/36 | (2006.01) |
| B32B 27/40 | (2006.01) |
| F16L 9/04 | (2006.01) |
| F16L 9/147 | (2006.01) |
| G01D 11/24 | (2006.01) |
| B29L 23/00 | (2006.01) |
| C23C 24/04 | (2006.01) |

(56) References Cited

U.S. PATENT DOCUMENTS

| | | | | |
|---|---|---|---|---|
| 5,551,484 | A | 9/1996 | Charboneau | |
| 6,634,388 | B1 | 10/2003 | Taylor | |
| 6,935,376 | B1 | 8/2005 | Taylor | |
| 7,258,141 | B2 | 8/2007 | Catha | |
| 7,374,127 | B2 | 5/2008 | Gallagher | |
| 8,567,448 | B2 | 10/2013 | Stringfellow | |
| 8,567,450 | B2 | 10/2013 | Stringfellow | |
| 9,310,014 | B2 | 4/2016 | Ekelund | |
| 9,453,606 | B2 | 9/2016 | Catha | |
| 10,288,207 | B2 | 5/2019 | Littlestar | |
| 10,436,667 | B2 | 10/2019 | Littlestar | |
| 11,112,049 | B2 | 9/2021 | Littlestar | |
| 2006/0151042 | A1 | 7/2006 | Stringfellow | |
| 2009/0308475 | A1* | 12/2009 | Stringfellow | F16L 11/12 138/125 |
| 2014/0176344 | A1 | 6/2014 | Littlestar | |
| 2014/0197264 | A1 | 7/2014 | Charboneau | |
| 2018/0236708 | A1 | 8/2018 | Charboneau | |
| 2021/0262888 | A1 | 8/2021 | Littlestar | |
| 2022/0143948 | A1 | 5/2022 | Weisenberg | |

* cited by examiner (m)
(l)
(k)
(j)
(i)
(h)
(g)
(f)
(e)
(d)
(c)
(b)
(a)

(a)

(b)

(c)

(d)

(e)

(f)

(g)

(h)

(i)

(a)

(b)

(c)

(d)

(e)

(f)

(g)

(h)

(i)

(j)

(k)

(l)

(m)

(a)

(b)

(c)

(d)

(e)

(a)

(b)

(c)

(d)

(e)

(a)

(b)

(c)

(d)

(e)

(f)

*(a)*

*(b)*

*(c)*

*(d)*

*(e)*

*(f)*

METHODS FOR INTELLIGENT COMPOSITE RENEWAL SYSTEM FOR STANDALONE, STORAGE, AND RENEWED PIPELINES, INCLUDING FOR REDUCED CARBON EMISSION AND FOR CONVERSION OF IN PLACE PIPELINES FOR CONVEYANCE OF HYDROGEN AND OTHER CLEAN FUELS

CROSS-REFERENCE TO RELATED APPLICATIONS

This application is a divisional of U.S. patent application Ser. No. 17/525,594, filed Nov. 12, 2021, which claims priority to U.S. Provisional Patent Application No. 63/232,355, filed Aug. 12, 2021, U.S. Provisional Patent Application No. 63/144,138, filed Feb. 1, 2021, and U.S. Provisional Patent Application No. 63/112,711, filed Nov. 12, 2020, the contents of all of which are incorporated herein by reference in their entireties.

FIELD OF THE INVENTION

Methods and manufactures disclosed herein generally relate to a tubular composite structure (TCS) composed of multiple layers of sealing, reinforcement, sensing, protection, and interspatial injected materials.

BACKGROUND OF THE INVENTION

Existing bare steel pipelines present significant risks to owners since pipelines are not coated and will not have the long-term integrity and lifespan of modern-day pipelines. These pipelines are more prone to develop leaks from corrosion, defect rupture or experience disruptions due to leaks. Steel and cast/ductile iron distribution systems are generally extremely old and represent significant risks for owners and operators. Most of these systems do not comply with the Gas Modernization Act and will require replacement, rehabilitation, or renewal. Aging pipelines continue to plague the industry: for example, TETCO has issued well over 400 notices of replacement or repair since 2019. Due to replacement and repair, summer maintenance has now started affecting producer's ability to transport to key markets for power and LNG, meaning pipelines are no longer just seasonal, they are under year-round stress. Furthermore, many of the natural gas pipelines currently in operation will need to possess and maintain integrity for their use for the transmission of hydrogen diluted media and high purity hydrogen in the future. It is estimated that 80% of the existing natural gas pipelines do not possess the structural integrity or composition required to resist hydrogen embrittlement, or to resist rupture with the increase in internal pressure or the cyclic pressure variations resulting from hydrogen-based transmission. These pipelines will need either replacement or renewal prior to hydrogen composition media conversion.

There are currently known compositions for pull-in-place internal lining systems that provide improved properties and/or repair degraded or damaged pipelines already in use. These lining systems are most closely related to certain methods and manufactures disclosed herein, and comprise linings made from unreinforced, reinforced high-density polyethylene (HDPE), fiber reinforced polymer pipe (FRP) or remotely spray or cast applied linings (SIPP). There are however numerous systemic problems or drawbacks associated with the known compositions, laminate combinations, materials, and methodologies.

The first noted drawback with current lining systems is that they can require extensive time or labor, and can have monetarily intensive shipping, handling, and carbon emissions in their manufacture and delivery to the jobsite for installation. The pull-in-place methods also create a large jobsite inventory footprint due to the core pipe used in their composition. This inventory footprint often creates environmental damage, public and business disruption, road detours or closures, and other logistical and environmental issues. Typically, these core pipes are delivered to the jobsite in 40 ft. long sections and depending on the diameter require between 18 and 400 roundtrip trucking events per one mile of installation. Another systemic problem with current pull-in-place lining systems is the manufacturing and joining methodologies. Current methodologies typically use standard or "off the shelf" premanufactured sections of HDPE, PVC or like pipe as the fundamental core cylinder in the manufacturing of the renewal lining system.

Again, these core pipes are typically limited to 40 ft. in length due to over the road shipping restrictions. These sections or "sticks" of core pipe require joining the ends to each other to create the lining system. Typically, this is done with butt fusion welding or a similar welding method for plastics. To make the manufacturing process efficient while pulling the lining system into the pipe, multiple joining or welding operations must be completed simultaneously so that longer sections of lining can be pulled into the host pipe instead of welding one butt joint and pulling in 40 ft. and then interrupting the installation process to weld another butt joint and repeat. This requirement to simultaneously weld multiple joints creates an extremely long manufacturing footprint and extremely long mobile onsite manufacturing facilities. Typically, and for efficiency, a minimum of 8 joints are aligned in parallel to the host pipe and then fusion or wedge welded together concurrently, thus creating a minimum longitudinal manufacturing area of 360 feet in length. In the case of pull-in-place lining systems that have additional manufacturing processes such as overwinding with reinforcement or compression winding after the joining of the core pipe sections, this manufacturing footprint can be more than 600 feet in length. By example, prior art identifies a system named Smart-Pipe wherein their "onsite" manufacturing facility is approximately 520 feet long.

Compounding the problem is the fact that these manufacturing processes also require considerable footprint width to allow for passage of machinery to move equipment and inventory along this long manufacturing area, thus creating a jobsite footprint of 400 ft. to 600 ft. in length and a minimum of 40 ft up to 100 ft. in width. This exceedingly large manufacturing footprint exacerbates the environmental damage and public and roadway disruption. Additionally, and possibly more importantly, many of these pull-in-place installations are completed in environmentally sensitive areas such as nature preserves, under rivers, lakes, oceans, or protected wetlands, which significantly increases the impact of this required large inventory, manufacturing area footprints as well as the potentiality of failure. Compounding these systemic issues, is the fact that these areas are difficult to enclose from poor climate environments. Enclosure and environmental control of these areas is critical to the quality control of the integral manufacturing processes. Many processes require that temperature and humidity be within certain ranges to assure the quality and long-term efficacy of the process. Due to the difficulties for enclosure and control of these environments, many installers often simply negate these requirements or interrupt progress. Conversely, with some pull-in-place lining systems, these requirements are met, however at significant cost to the end user/purchaser of the lining system. Moreover, this comes at a significantly increase time intensity to the overall completion of the project due to the considerable manpower and equipment required to facilitate assembling and disassembling these structures each time the mobile manufacturing process must relocate to the next host pipe access for continuation of the installation process.

An additional systemic problem with these current "off the shelf" core cylinder practices is the limited scope of materials available for use. Most current systems use HDPE or PVC for their core cylinder material, i.e., the material in contact with pipeline media. While these current systems are constrained to the use of HDPE, PVC or similar premanufactured pipe materials, and some like FRP that require a separate internal liner installed for Hydrogen resistance, there are many applications that are much better suited for specialized materials with higher resistance to the transmitted media through the pipeline and materials that are better suited to provide much longer design life. By example, HDPE has been historically used for hydrogen in static pressurized storage such as cylindrical tanks and very low-pressure dynamic environments such as distribution pipelines. However, there is little historical data or testing on its efficacy for resistance to diffusion, failure, or design life in high pressure dynamic environments such as transmission pipelines. Scientific testing has shown that HDPE is as much as 6× more permeable to natural gas/hydrogen mixtures than it is to natural gas/methane alone, and that hydrogen permeation increases exponentially with increased of applied pressures. Current pull in place methods such as smart-pipe fold the HDPE line material during the installation process to provide a friction bond to the host pipe when the HDPE is then reformed in the host pipe. This reforming practice notably increases the potential for crack propagation in hydrogen environments.

Many existing core cylinder practices are constrained not only by the type of material, but by the size and geometry of available components. For example, systems that employ FRP are typically limited to 12 inch diameter pipes. The Thermo-Flex system is further constrained to 8 inch diameter pipes, due both to bending limitation for storing larger pipes on spools, and inefficiencies in winding larger diameter pipes on spools. Finally, the Smart-Pipe system, which utilizes HDPE, confronts weight and size constraints from its manufacturing process for pipes larger than 12 inches.

Furthermore, materials such as steel, PVC and PTFE experience a permanent deleterious effect when exposed to high pressure hydrogen, resulting in an irreversible decrease in long term resistance to diffusion and in steel, pipe embrittlement. Additionally, a problem with the use of an "off the shelf" core cylinder is they are only available in limited nominal dimensions. This results in the potential for an "off the shelf" cylinder diameter that is dissimilar in diameter to the host pipe to be lined. This described event inherently is a detriment in the renewal design, as the OD of the core cylinder may be significantly smaller in diameter than the ID of the host pipe, while the next larger diameter is too large to fit in the host pipe. By utilizing the smaller diameter off the shelf cylinder as the only available option, it creates a much-reduced cross-sectional diameter in the renewed host pipe, thus reducing flow capacity or increasing internal pressure to realize the required flow. Therefore, utilizing "off the shelf" HDPE, PVC or like pipe as the core cylinder limits the owner, operator, and contractor from doing custom fit installations for the wide variety of host pipe diameters, loading conditions and compositions in the field.

While HDPE is a universal core material, another critical issue with using this type of core cylinder material is that it does not possess the structural integrity to contain the internal pressures typically required in the energy media transmission or for large diameters in the municipal sector. While the installation of unreinforced HDPE, PVC will stop existing leaks and potentially mitigate continuing internal corrosion in the pipeline, its use as a renewal or repair method decreases the pipelines maximum allowable operating pressure (MAOP). This required reduction in MAOP directly causes a derating of the pipeline system by regulatory authorities, thus significantly reducing the pipelines output due to the associated decrease in total flow of media. This required reduction in flow has a severe impact on the financial efficacy of the pipeline for its owner/operator as well as disrupting customer supplies.

The use of HDPE or thermosetting plastic material alone in these current pull-in-place methodologies also creates the issue of increased weight and decreased flexibility. The efficacy of the pipeline renewal practice must take these two factors into consideration as firstly the owners/operators need their pipelines in operation as much as possible for financial considerations and/or contractual obligations to their customers. Basically, the more pipeline that can be renewed to meet or exceed the original design in the least amount of time is the best solution in this industry, as it decreases the overall amount of time that the host pipeline being renewed/repaired needs to be taken out of service. In all energy, industrial and municipal pipelines, but more specifically transmission pipelines, there are very long sections of pipeline unencumbered by valves, expansion loops, etc., so the ability to renew these pipelines as expeditious as possible will always be best practice for the owners and operators.

Again, all lesser current methodologies utilize this core plastic cylinder (prefabricated pipe) for both buckling resistance (soil load, hydrostatic load, highway load & vacuum) and for resistance to internal pressure (hoop, radial or circumferential). To meet these resistance criteria, the higher the required resistance, the thicker the wall of the core cylinder needs to be. Additionally, due to the manufacturing processes utilized in the production of these core cylinders, such as extrusion, there is intrinsic ovality in the final product. This ovality results in reduced resistance to hoop stresses and buckling forces as opposed to the tubular composite structure described herein, wherein there is zero ovality in the final core cylinder due to production methodology. This reduction in ovality affords the tubular composite structure increased structural integrity with reduced material thicknesses and reduced costs.

Considering both the low hoop strength and the low modulus of HDPE, as compared to those for the materials that can be used for the tubular composite structure, the wall thickness of HDPE must be comparatively minimum of 2× the thickness. Additionally, due to the low softening point of polyethylene in applications where heated media is transmitted, this wall thickness increases exponentially. This required increase in thickness creates three systemic impediments with the utilization of HDPE, PVC on high pressure/high flow pipelines. Firstly, the increased thickness results in the lining system being of higher weight per linear foot, thus resulting in reduced lengths it can be pulled into the existing host pipe without tension and/or friction related damage. Secondly, this increase in material thickness directly decreases the flexibility of the current lining systems. This decrease in flexibility impedes the lining systems ability to traverse undulations (sags or protrusions) and/or to traverse through even minor bends in the pipeline.

There are currently known compositions of remotely sprayed in place (SIPP) systems and other spray applied renewal systems that provide improved properties and/or repair of degraded or damaged pipelines already in use. These systems are most closely related to the methods and manufactures disclosed herein, in that they provide materials and methodologies for the rehabilitation of common pipeline systems. There are many drawbacks to the utilization of such materials and methodologies for both transmission and distribution pipeline systems. The first of these systemic issues is that they do not meet the requirements of a Class IV fully structural lining for pressure pipe per the AWWA M28 Structural Classifications. Current spray applied systems do not possess auxiliary axial or hoop reinforcement and rely on the spray applied material solely to provide resistance to both axial and radial loading from internal pressure. Without auxiliary reinforcement, such as axial reinforcement fibers, bi-directional fabric and/or radially wound filament, the spray applied material must resist all hoop stresses created by the internal pressure of the media as well as resisting the creep effect of being subjected to constant strain, thus reducing the long-term retention of physical properties through fatigue. When expending the time and resources and the facilitation of public disruption to renew a pipeline, most owners and operators of pipeline systems prefer to install a renewal system that is fully structural so that in the event the pipeline should fail or corrode away, the renewal lining system will resist all internal and external loading independent of the host pipe. The overall time resources utilized in providing a lesser lining system such as spray applied is greater than many of the available fully structural renewal remedies available. Beyond not being classified as fully structural and being no more cost effective, the next drawback in utilizing spray applied systems, and unlike the tubular composite structure described herein, is that there are a multitude of potential quality control parameters that to date simply have not been rectified by the industry.

With the tubular composite structure disclosed herein, all the material quality control checks are completed in real time prior to, during, and immediately after manufacturing and prior to installation and in a highly controlled environment. If any of these previously mentioned quality issues, flaws or faults occur, they can be easily rectified in the same environment prior to the installation process. With current remote spray applied lining systems, the specified quality control functions are either negated, done post installation, or are required to be done remotely in an underground pipe system. In the pipeline renewal industry, the renewal process is typically being instituted due to the host pipe failing or being in the process of failing. These old and degraded pipe systems present a wide variety of sometimes uncontrollable variables that are difficult to mitigate for remote spray application efficacy. This especially holds true with spray applied materials that have tight processing parameters that become increasingly more difficult to meet or to be inspected in real time during the remote spraying process.

In consideration of the inclusive overview of the systemic and individually specific issues with the current lining materials and methodologies for the renewal and repair of transmission and distribution pipelines, an improved and innovative solution is required.

SUMMARY OF THE INVENTION

Certain methods and manufactures disclosed herein further relate to the utilization of materials, manufacturing, mechanical function, and methodologies to produce tubular composite structures for the renewal of pipeline systems, standalone pipelines and standalone coiled storage usages.

Certain methods and manufactures disclosed herein further relate to the utilization of materials, manufacturing, mechanical function, and methodologies to produce tubular composite structures for the renewal of pipeline systems while they remain in service.

Certain methods and manufactures disclosed herein further relate to the utilization of materials, manufacturing, mechanical function, and methodologies to produce tubular composite structures for the renewal of pipeline systems during out of service events.

Certain methods and manufactures disclosed herein also further relate to the utilization of materials, manufacturing, mechanical function, and methodologies to meaningfully reduce carbon emissions into the atmosphere while also providing a safe tubular containment solution for traditional, renewable energy and municipal media.

Certain methods and manufactures disclosed herein relate to rapid structural renewal, repairs, data acquisition, monitoring and communication in the storage and pipeline transmission and distribution of pressurized liquid or gaseous media, including but not limited to natural gas and natural gas derivatives, carbon dioxide, hydrogen and hydrogen derivatives, crude oil, gasoline, other potentially hazardous liquids as well as the storage and conveyance of municipal and industrial water and sewer.

Certain methods and manufactures disclosed herein relate to a pull-in-place and/or push in place tubular composite structure for internal pipe surfaces and independent coiled storage, and more particularly relate to such tubular composite structures formed of multiple layers, and even more particularly relate to such tubular composite structures adapted and adaptable for use in the independent coiled storage and structural renewal and/or the emergency repair of degraded, damaged, or leaking pipelines, or such tubular composite structures adapted and adaptable to improve or upgrade qualities and characteristics of pipes prior to or after use or installation.

Certain methods and manufactures disclosed herein relate to a pull-in-place and/or push in place tubular composite structure for internal pipe surfaces and subterranean storage. More particularly, these methods and manufactures relate to providing bore-holes in the ground or bedrock to depths up to 20,000 feet, and inserting TCS structures into the bore-holes. These methods and manufactures can be particularly useful for storing significant quantities of media, including CNG, and $H_2$, while requiring modest surface-level acreage for this storage.

Certain methods and manufactures disclosed herein relate to the insertion and forming of the tubular composite structure on the interior of the pipe, and the utilization of interspatial layers for the post point injection of flowable, and optionally curable, material for increasing strength, sealing mechanics, pipe stabilization, fatigue resistance, performance, and design life of the tubular composite structure.

Certain methods and manufactures disclosed herein relate to systems and methods for providing safe and efficient storage and transfer of compressible gaseous and liquefied hydrocarbon and non-hydrocarbon media underground in a small plot space and for providing a faster, more affordable, and efficient traditional and renewable energy media storage and delivery system for on demand peaking and back-up operations of industrial facilities. A coiled orientation of tubular composite structure is composed of multiple layers of sealing, reinforcement, sensing components and protection materials.

Certain methods and manufactures disclosed herein relate to the utilization of materials, manufacturing, mechanical and electromechanical function, and methodologies to meaningfully reduce carbon emissions into the atmosphere while also providing a safe loading, delivery, and storage solution for traditional and renewable energy media.

Certain methods and manufactures disclosed herein relate to a tubular structure which is designed to provide rapid onsite appointment of localized media storage while concurrently providing data acquisition, monitoring, self-inspection, and communication for safe, reliable, and long and short-term stowage and access to stored media.

Certain methods and manufactures disclosed herein relate to the storage and localized conveyance of pressurized liquid or gaseous media, including but not limited to natural gas and natural gas derivatives, carbon dioxide, hydrogen and hydrogen derivatives, crude oil, gasoline, other potentially hazardous liquids as well as the storage and localized conveyance of potable and non-potable water. Certain methods and manufactures disclosed herein relate generally to a tubular storage and conveyance system in a coiled orientation with internal diameters ranging from 20 inches (508 mm) to 54 inches (1372 mm) and more particularly relate to such tubular composites formed of multiple layers, and even more particularly relate to such tubular composite structures for the high pressure and high-volume storage and localized conveyance of hydrogen gas or liquid.

Certain methods and manufactures disclosed herein relate to the interspatial encapsulation of the tubular composite structure by external point injection of flowable, and optionally curable, material for the restraint of axial transfer and resistance to external dead and live loading for to permit multi-level tubular storage coils or full access to the commercial or private utilization of the ground cover over the storage system after installation.

Certain methods and manufactures disclosed herein relate to an autonomous, remotely controlled, and GPS navigated mobile factory platform for the onsite manufacturing and dynamic placement of the coiled tubular composite structure.

Disclosed herein in an exemplary embodiment is a tubular composite structure ("TCS"), comprising 1, 2, 3, 4, or 5 of the following tubular assembly, from innermost surface to outermost surface:

(a) a sealing layer,
(b) one or more axial reinforcement layers,
(c) a hoop reinforcement layer, and
(d) a protective layer;
each tubular assembly optionally further comprising a sensor array layer; and
the tubular composite structure optionally further comprising one or more interspatial annular cylinders between adjacent tubular assemblies.

Also disclosed herein in an exemplary embodiment is a binary tubular composite structure ("BTCS"), comprising the following concentric tubes, from innermost surface to outermost surface:

(a) a first sealing layer,
(b) a first axial reinforcement layer,
(c) a first hoop reinforcement layer,
(d) a first protective layer,
(e) an optional interspatial annular cylinder,
(f) a second sealing layer,
(g) a second axial reinforcement layer,
(h) a second hoop reinforcement layer, and
(i) a second protective layer;
the binary tubular composite optionally further comprising one or more sensor array layers.

Also disclosed herein in an exemplary embodiment is a renewed pipe structure pair, the pair comprising:
a host pipe, and
a tubular composite structure, comprising 1, 2, 3, 4, or 5 of the following tubular assembly, from innermost surface to outermost surface:
(a) a sealing layer,
(b) one or more axial reinforcement layers,
(c) a hoop reinforcement layer, and
(d) a protective layer;
each tubular assembly optionally further comprising a sensor array layer;
the tubular composite structure optionally further comprising interspatial one or more annular cylinders between adjacent tubular assemblies; and
the renewed pipe structure pair further comprising an interspatial annular cylinder between the outer surface of the outermost tubular assembly and the inner surface of the host pipe.

Also disclosed herein in an exemplary embodiment are methods for renewing a host pipe, the methods comprising the steps of:
fashioning a tubular composite structure as disclosed herein; and
fitting the tubular composite structure within the interior of the host pipe.

Also disclosed herein in an exemplary embodiment are methods for storing liquid or gaseous media, the method comprising the step of introducing the material into a tubular composite structure as disclosed herein.

Also disclosed herein in an exemplary embodiment is a mobile onsite factory ("MOF"), comprising a means for fashioning a sealing layer from plastic feedstock.

Also provided are exemplary embodiments wherein any embodiment above may be combined with any one or more of these embodiments, provided the combination is not mutually exclusive.

As used herein, two embodiments are "mutually exclusive" when one is defined to be something which is different than the other.

BRIEF DESCRIPTION OF THE DRAWINGS

The disclosure will be described in conjunction with the following drawings in which like reference numerals designate like elements and wherein.

DETAILED DESCRIPTION OF PREFERRED EMBODIMENTS

Figure 1:
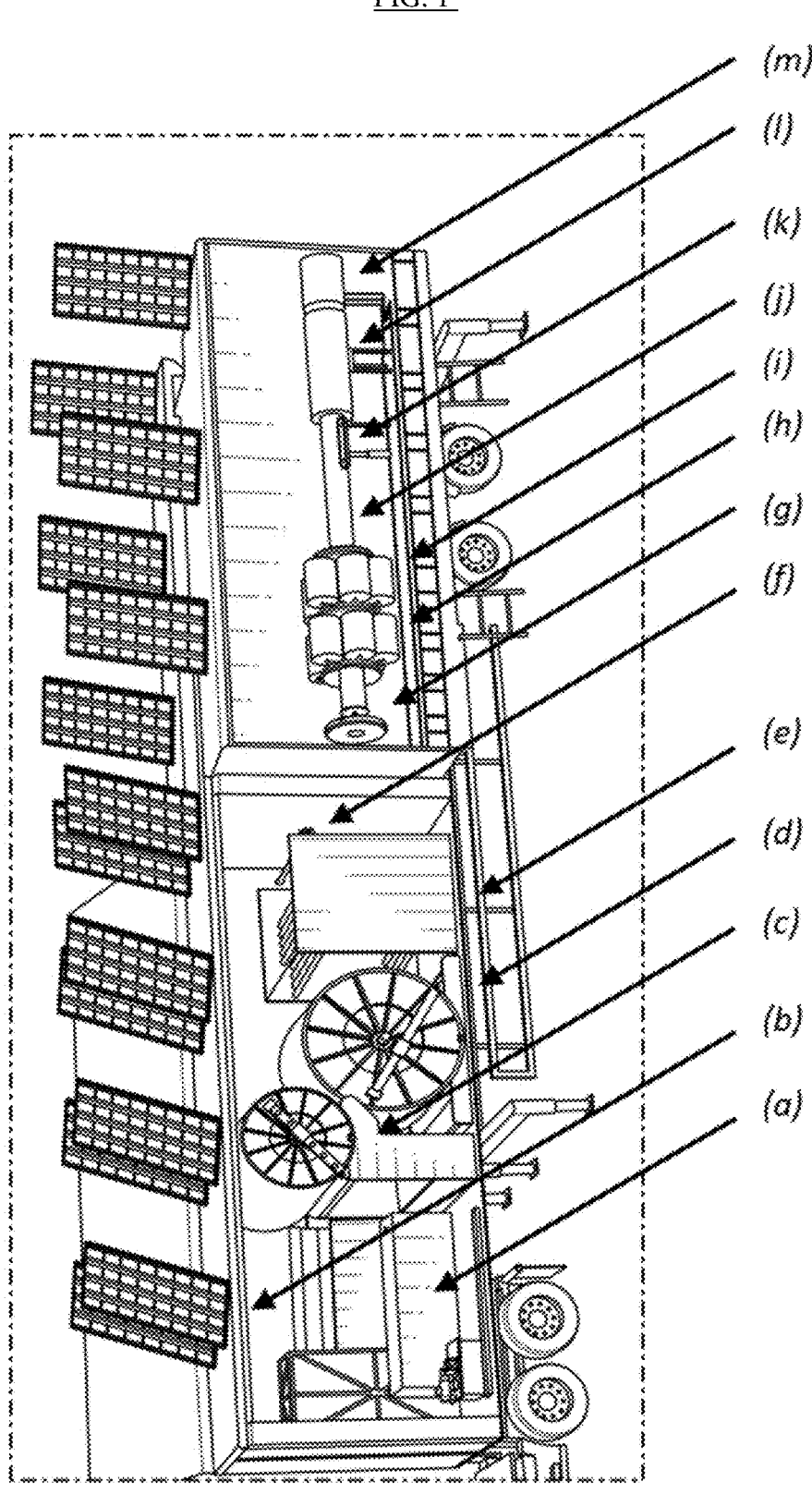
FIG. 1 depicts a mobile onsite factory ("MOF") with components for assembling a tubular composite structure ("TCS") (a) natural gas power generator (b) solar panels (c) reserve spool for sealing layer material (d) active spool for sealing layer material (e) material centering mechanism (f) autoclave (g) shaper (h) orbital winder for hoop layer (i) orbital winder for protective layer (j) mandrel (k) roller assembly (l) autoclave (m) spray coating assembly.
Figure 2:
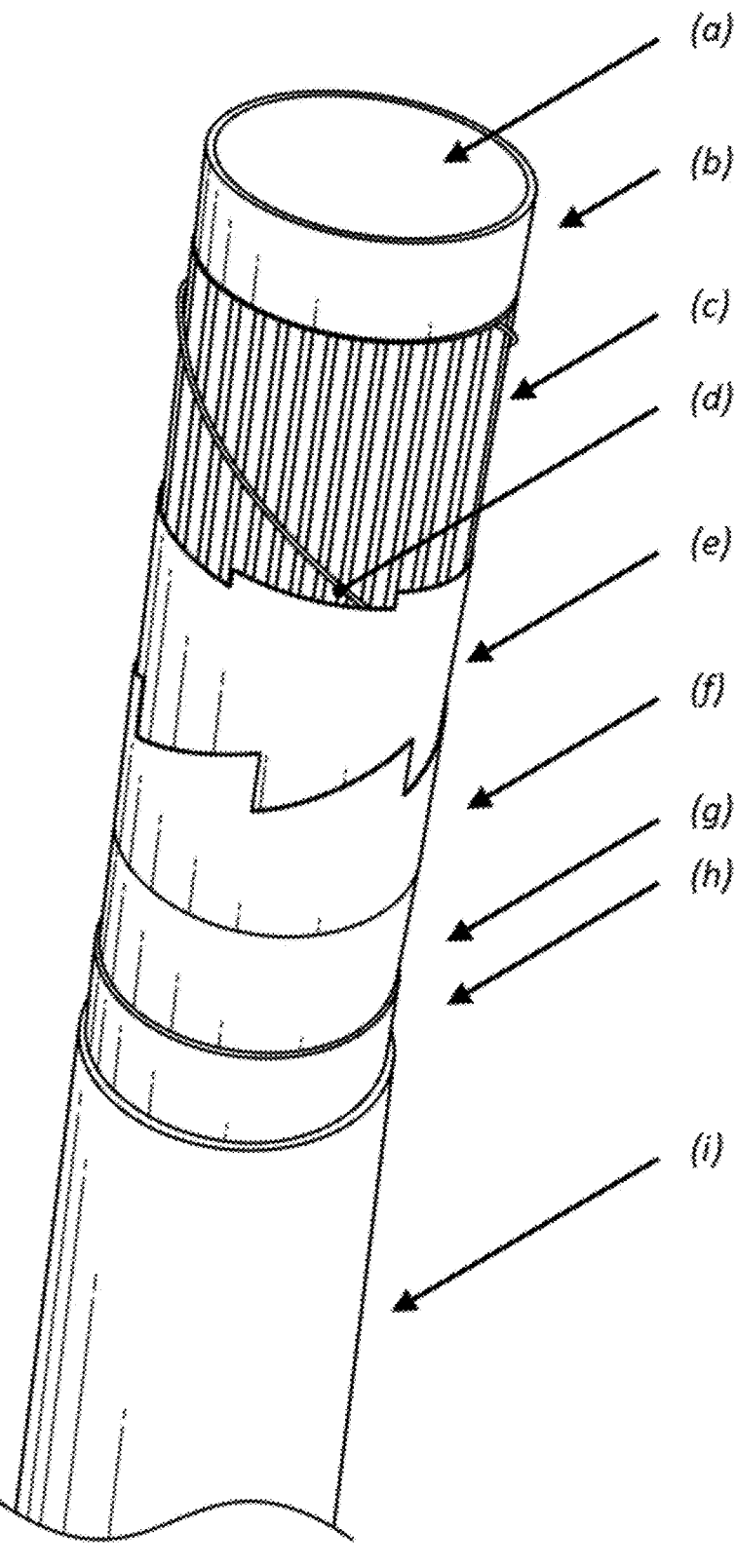
FIG. 2 depicts the various layers in a pipe renewal project, consisting of a host pipe and a single-layered TCS (a) optional over-mold layer (b) sealing layer (c) axial reinforcement layer (d) helical sensor array layer (e) hoop reinforcement layer (f) protective layer (g) cold spray layer (h) interspatial annular cylinder (i) host pipe.
Figure 3:
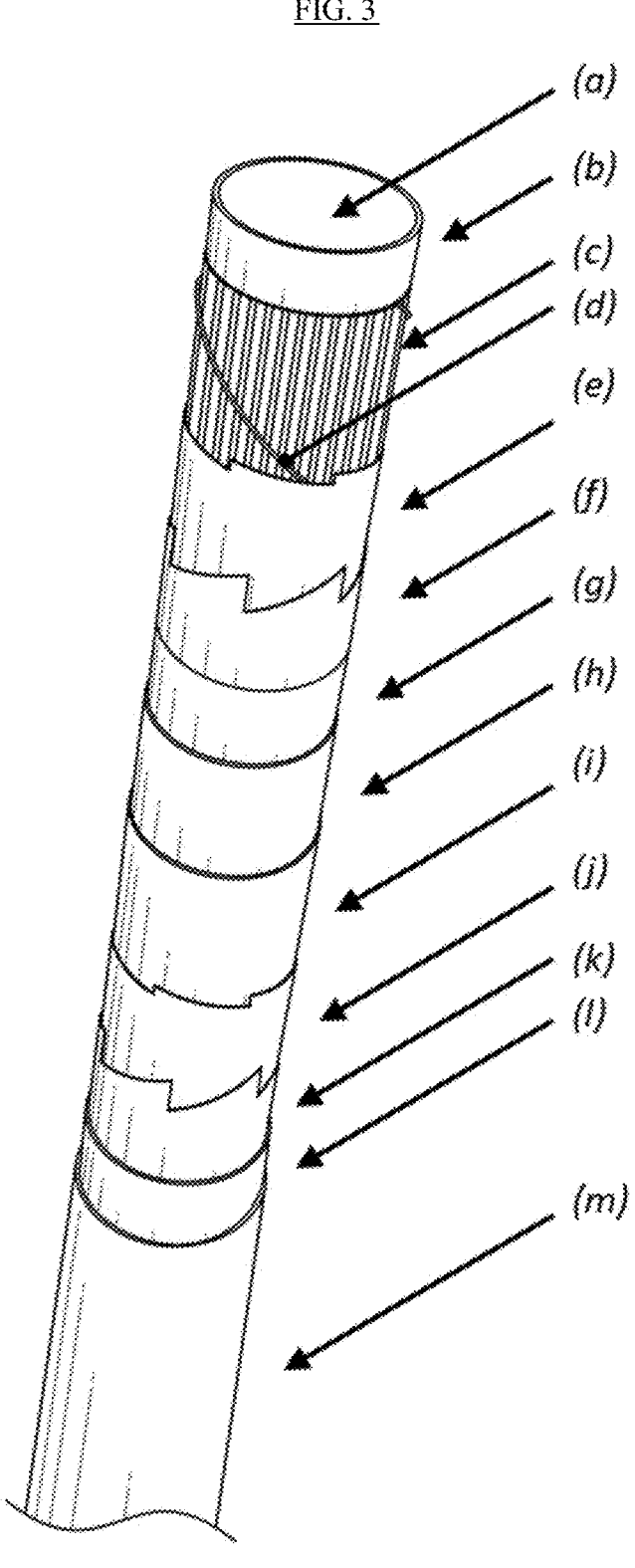
FIG. 3 depicts the various layers in a pipe renewal project, consisting of a host pipe and a binary TCS ("BTCS") (a) optional over-mold layer (b) first sealing layer (c) first axial reinforcement layer (d) helical sensor array layer (e) first hoop reinforcement layer (f) first protective layer (g) first interspatial annular cylinder (h) second sealing layer (i) second axial reinforcement layer (j) second hoop reinforcement layer (k) second protective layer (1) second interspatial annular cylinder (m) host pipe.
Figure 4:
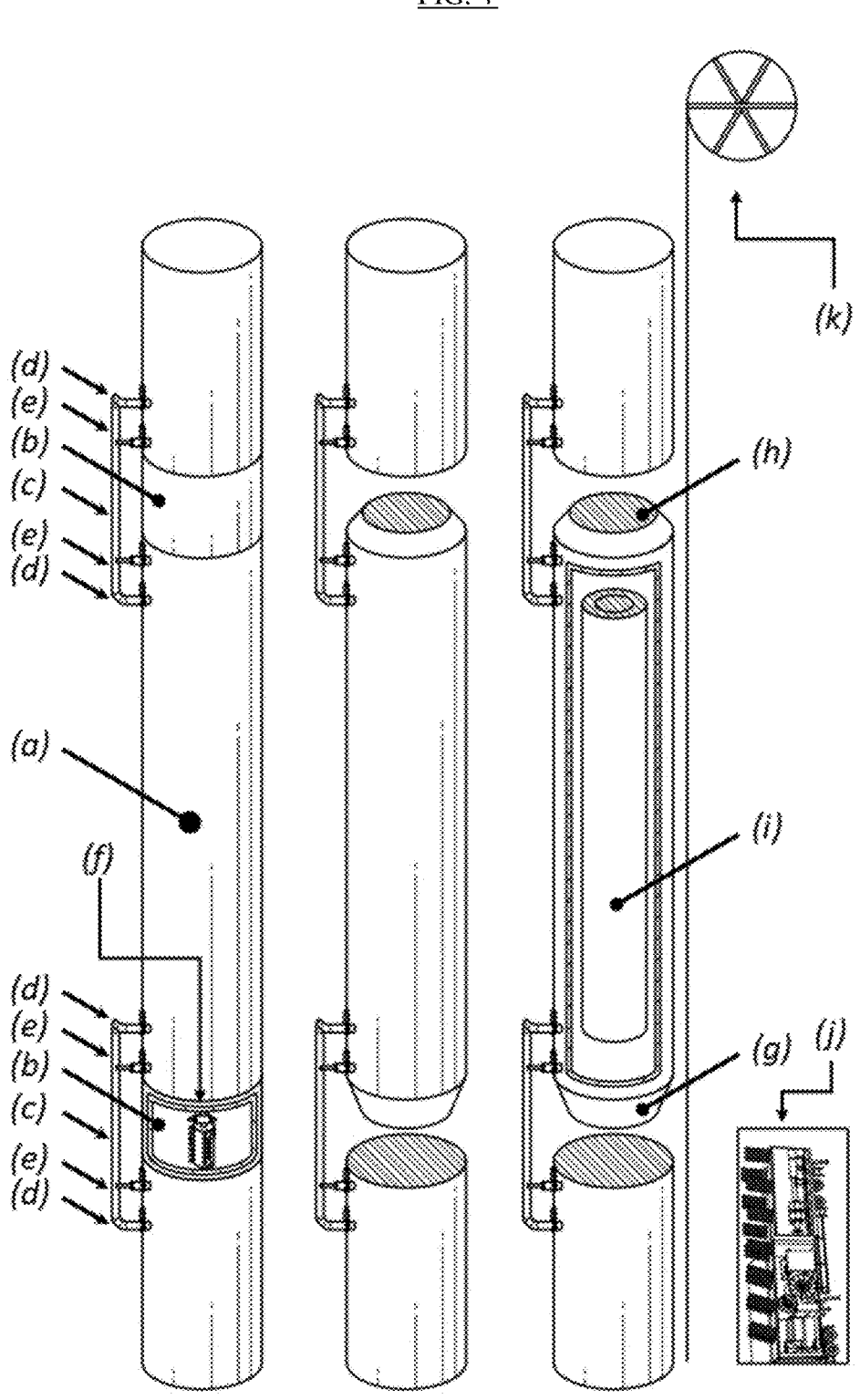
FIG. 4 depicts a schematic for a two-pup hot tapping/line stopping procedure for pipe renewal (left/center/right) intact host pipe with pups identified/pipe with pups removed and medium diverted/pipes with TCS in place. (a) host pipe (b) pup (x2) (c) conduit (x2) (d) hot tapping fixtures (x4) (e) line stop fixtures (x4) (f) lateral robot (shown in cutaway for approximate scale) (g) insertion end sealing flange (h) winch end sealing flange (i) TCS (j) MOF (k) spool for plasma rope.
Figure 5:
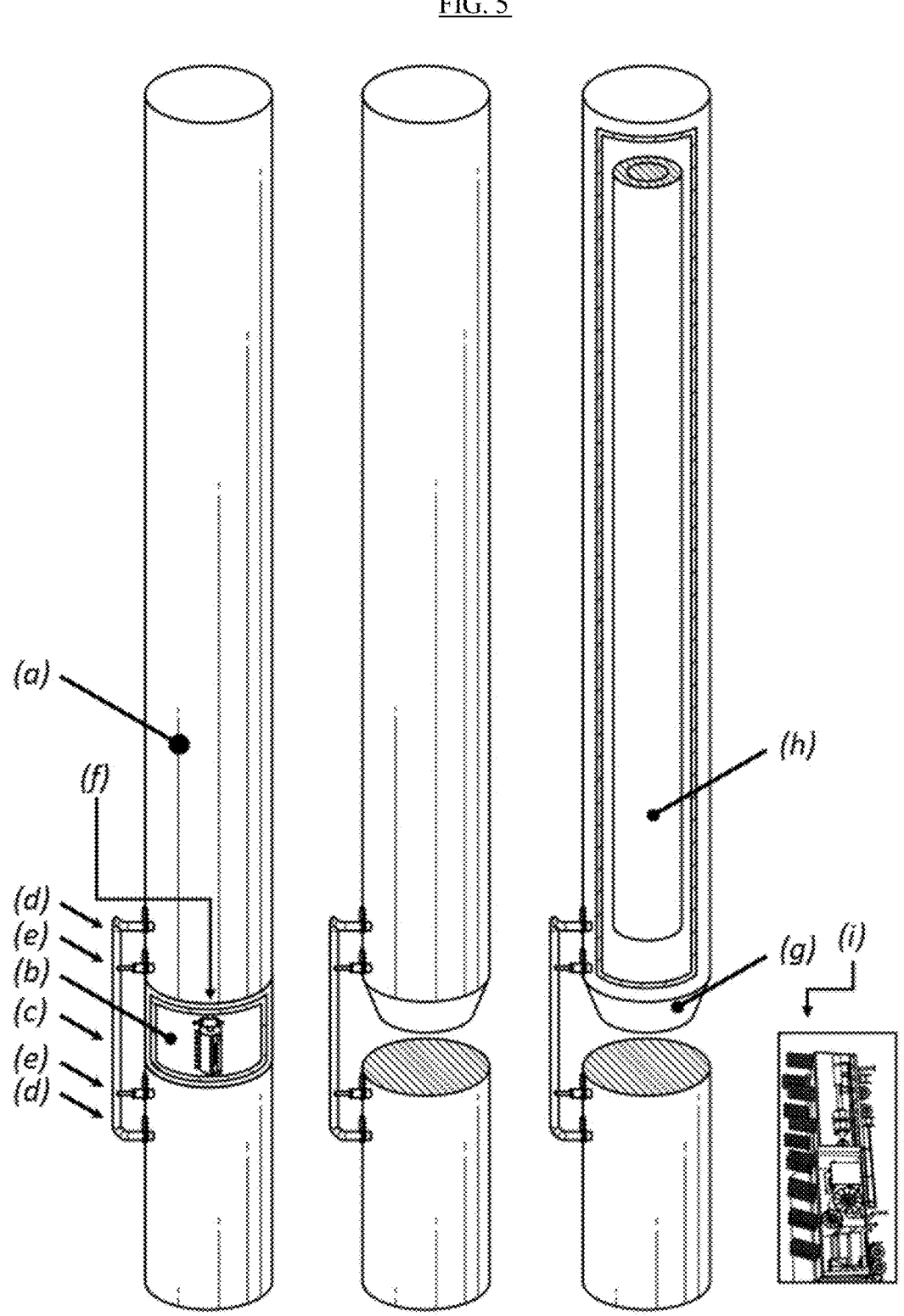
FIG. 5 depicts a schematic for a single-pup hot tapping/line stopping procedure for pipe renewal (left/center/right) intact host pipe with pup identified/pipe with pup removed and medium diverted/pipes with TCS in place. (a) host pipe (b) pup (c) conduit (d) hot tapping fixtures (x2) (e) line stop fixtures (x2) (f) lateral robot (shown in cutaway for approximate scale) (g) insertion end sealing flange (h) TCS (i) MOF.
Figure 6:
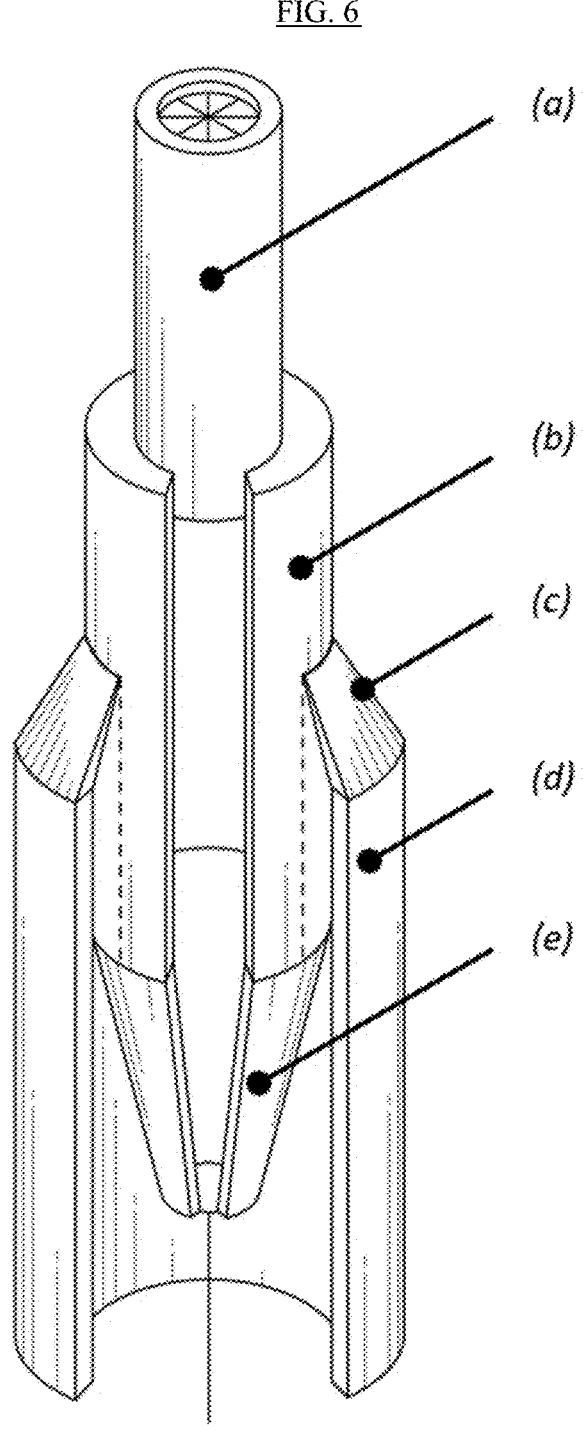
FIG. 6 depicts a schematic for insertion of a TCS through a sealing flange and into a host pipe. (a) mandrel (b) TCS (c) sealing flange (d) host pipe (e) pulling plug.
Figure 7:
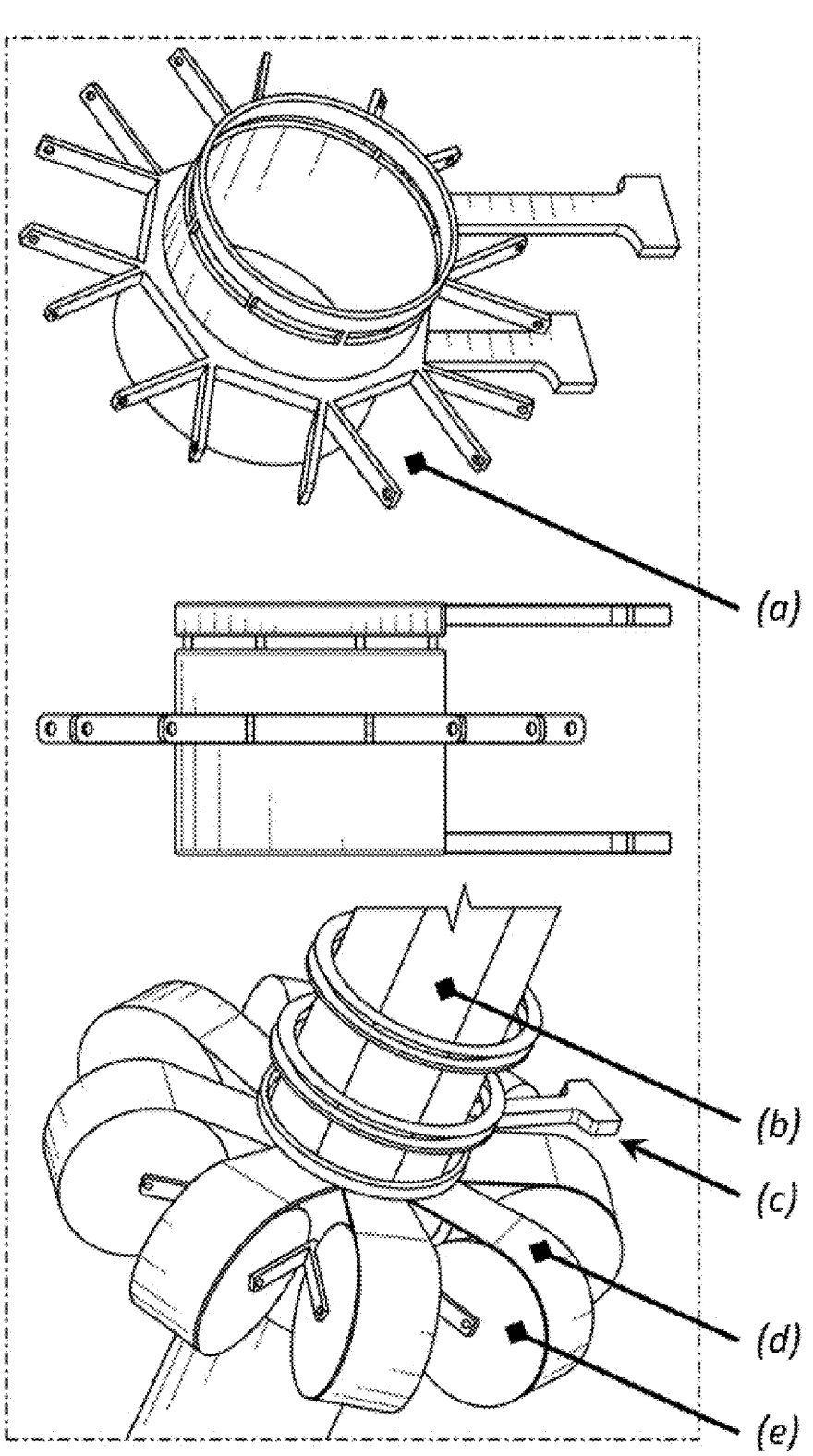
FIG. 7 depicts views of the axial reinforcement layer applicator (top/middle/bottom) perspective without axial reinforcement material spools/projection/perspective with axial reinforcement material spools. (a) Bracket for mounting spools (x8) (b) mandrel (c) support (d) axial reinforcement material (x8) (e) spool (x8).
Figure 8:
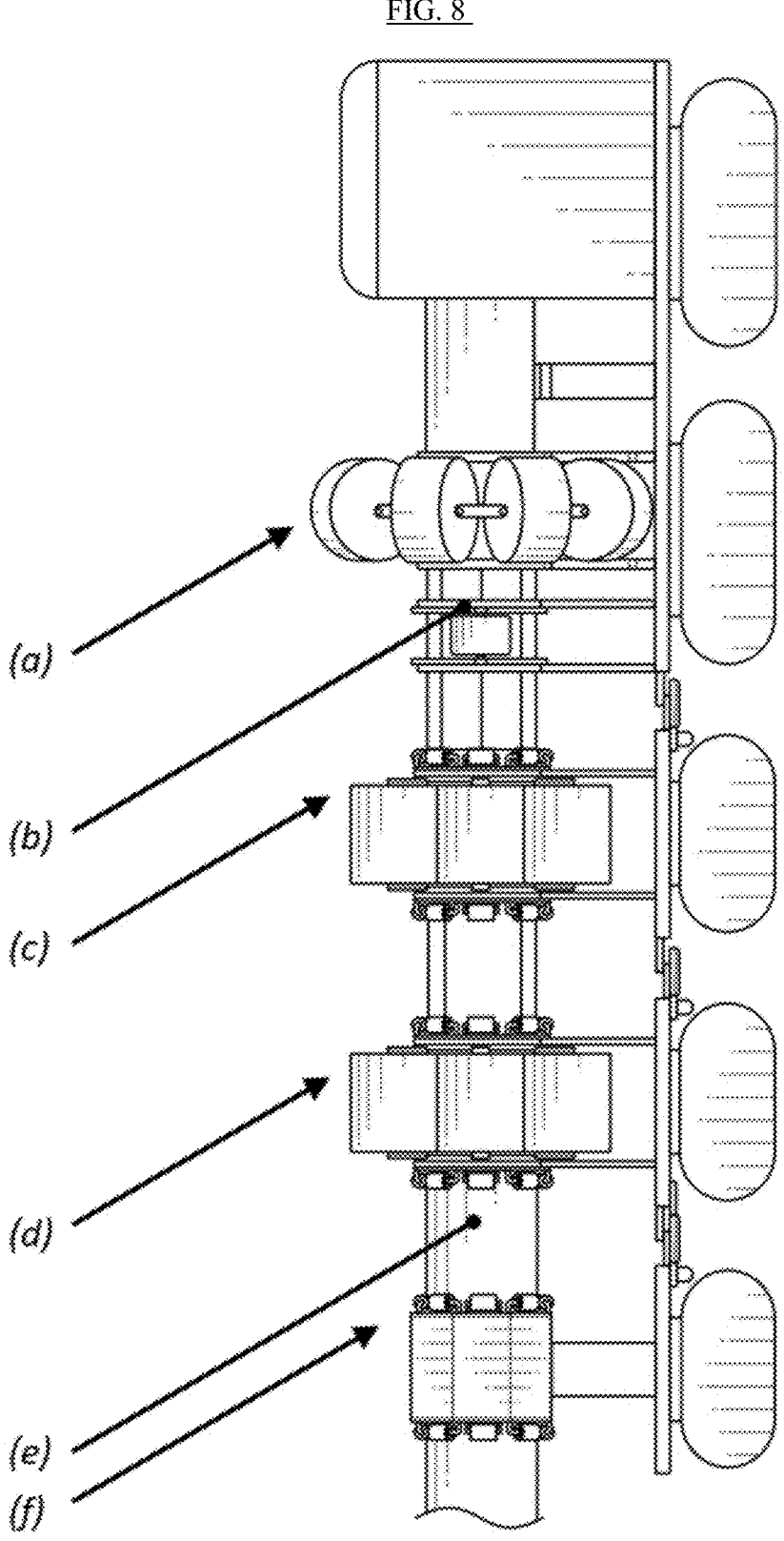
FIG. 8 depicts the core components to the TCS forming mechanism. (a) Axial reinforcement layer applicator (b) orbital winder for sensor array layer (c) orbital winder for hoop reinforcement layer (d) orbital winder for protective layer (e) mandrel (f) Autoclave/coating applicator.
Figure 9:
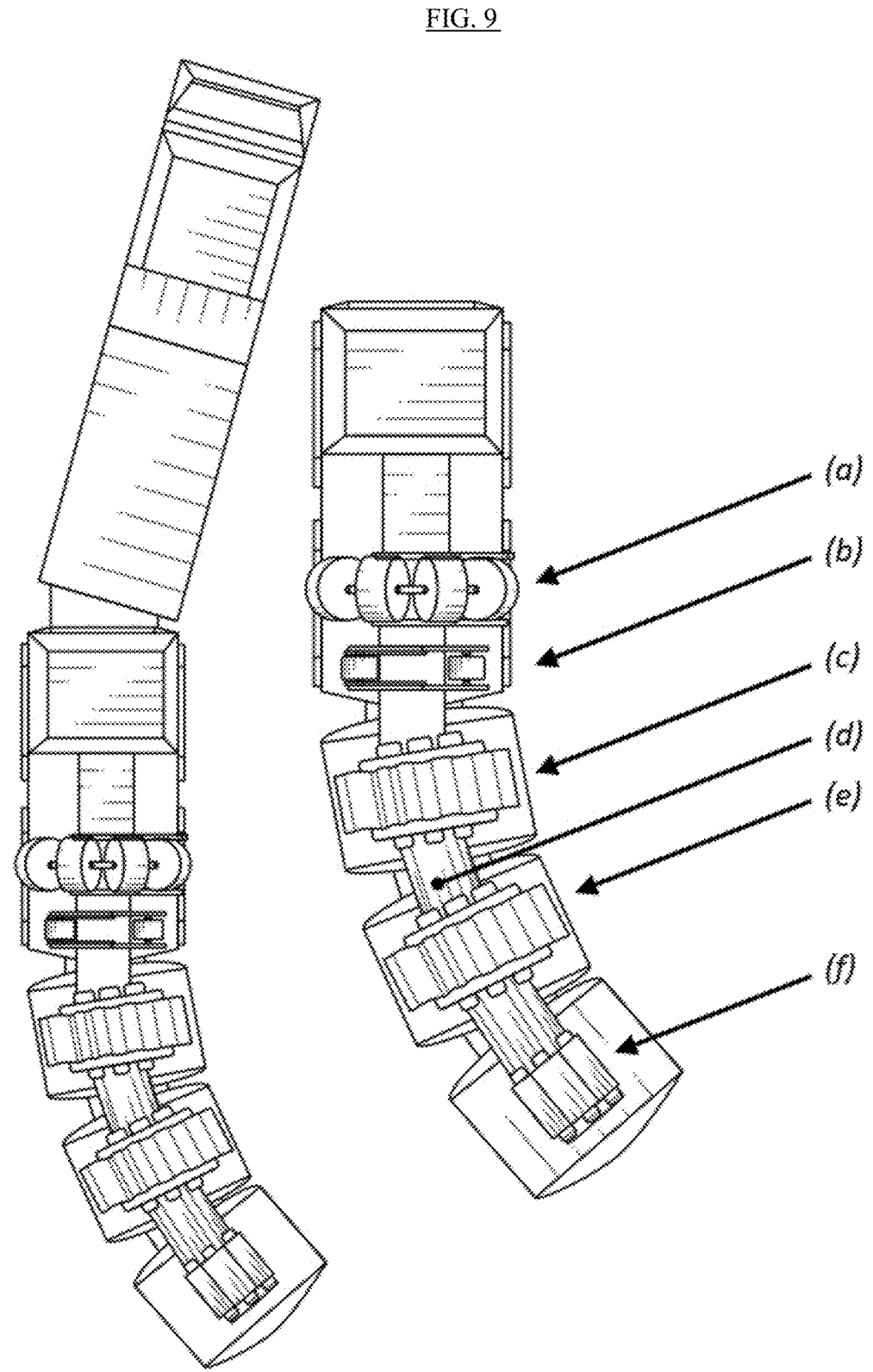
FIG. 9 depicts the core components to an alternate configuration for the TCS forming mechanism that introduces curvature. (a) Axial reinforcement layer applicator (b) orbital winder for sensor array layer (c) orbital winder for hoop reinforcement layer (d) articulated mandrel (e) orbital winder for protective layer (f) autoclave/coating applicator.

Disclosed herein is a tubular composite structure ("TCS"), comprising 1, 2, 3, 4, or 5 of the following tubular assembly, from innermost surface to outermost surface:
    (a) an optional sealing layer,
    (b) one or more axial reinforcement layers,
    (c) a hoop reinforcement layer, and
    (d) an optional protective layer;
    each tubular assembly optionally further comprising a sensor array layer; and
    the tubular composite structure optionally further comprising one or more interspatial annular cylinders between adjacent tubular assemblies.
Also disclosed herein is a tubular composite structure ("TCS"), comprising 1, 2, 3, 4, or 5 of the following tubular assembly, from innermost surface to outermost surface:

(a) a sealing layer,
    (b) one or more axial reinforcement layers,
    (c) a hoop reinforcement layer, and
    (d) a protective layer;
    each tubular assembly optionally further comprising a sensor array layer; and
    the tubular composite structure optionally further comprising one or more interspatial annular cylinders between adjacent tubular assemblies.

In certain embodiments, the TCS comprises 2, 3, 4, or 5 of the tubular assemblies. In certain further embodiments, the TCS further comprises one or more interspatial annular cylinders between adjacent tubular assemblies. In certain further embodiments, the TCS further comprises an interspatial annular cylinder between each pair of adjacent tubular assemblies.

In certain embodiments, one or more interspatial annular cylinders contains a flowable, and optionally curable, material. In some embodiments, the interspatial annular cylinders contain a flowable, and optionally curable, material. In some embodiments, one or more interspatial annular cylinders contains a flowable and curable material. In some embodiments, the interspatial annular cylinders between adjacent tubular assemblies contain a flowable and curable material.

In certain embodiments, the TCS comprises the following tubular assembly, from innermost surface to outermost surface:
    (a) a sealing layer,
    (b) one or more axial reinforcement layers,
    (c) a hoop reinforcement layer, and
    (d) a protective layer;
    and optionally further comprising a sensor array layer.

In certain embodiments, the tubular composite structure comprises two of the following tubular assemblies, from innermost surface to outermost surface:
    (a) a sealing layer,
    (b) one or more axial reinforcement layers,
    (c) a hoop reinforcement layer, and
    (d) a protective layer;
    each tubular assembly optionally further comprising a sensor array layer; and
    the tubular composite structure optionally further comprising an interspatial annular cylinder between the two tubular assemblies.

In certain embodiments, the TCS further comprises an interspatial annular cylinder between the two tubular assemblies. In certain further embodiments, the interspatial annular cylinder contains a flowable, and optionally curable, material. In certain further embodiments, the interspatial annular cylinder contains a flowable and curable material.

In certain embodiments, the TCS comprises the following concentric tubes, from innermost surface to outermost surface:
    (a) a first sealing layer,
    (b) a first axial reinforcement layer,
    (c) a first hoop reinforcement layer,
    (d) a first protective layer,
    (e) an optional interspatial annular cylinder,
    (f) a second sealing layer,
    (g) a second axial reinforcement layer,
    (h) a second hoop reinforcement layer, and
    (i) a second protective layer;
    the binary tubular composite optionally further comprising one or more sensor array layers.

In certain embodiments, the TCS comprises (e) an interspatial annular cylinder between (d) the first protective layer and (f) the second sealing layer. In some embodiments, the interspatial annular cylinder contains a flowable, and optionally curable, material. In some embodiments, the interspatial annular cylinder contains a flowable and curable material.

Also disclosed herein is a renewed pipe structure pair, the pair comprising:

a host pipe, and a tubular composite structure ("TCS"), comprising 1, 2, 3, 4, or 5 of the following tubular assembly, from innermost surface to outermost surface:

(a) a sealing layer, (b) one or more axial reinforcement layers, (c) a hoop reinforcement layer, and (d) a protective layer;

each tubular assembly optionally further comprising a sensor array layer;

the tubular composite structure optionally further comprising one or more interspatial annular cylinders between adjacent tubular assemblies; and the renewed pipe structure pair further comprising an interspatial annular cylinder between the outer surface of the outermost tubular assembly and the inner surface of the host pipe.

In certain embodiments, the TCS comprises 2, 3, 4, or 5 of the tubular assemblies. In certain further embodiments, the TCS further comprises one or more interspatial annular cylinders between adjacent tubular assemblies. In certain further embodiments, the TCS further comprises an interspatial annular cylinder between each pair of adjacent tubular assemblies. In certain further embodiments, one or more interspatial annular cylinders between adjacent tubular assemblies in the renewed pipe structure pair contains a flowable, and optionally curable, material. In certain further embodiments, the interspatial annular cylinders between adjacent tubular assemblies in the renewed pipe structure pair contain a flowable, and optionally curable, material. In certain further embodiments, one or more interspatial annular cylinders between adjacent tubular assemblies in the renewed pipe structure pair contains a flowable and curable material. In certain further embodiments, the interspatial annular cylinders between adjacent tubular assemblies in the renewed pipe structure pair contain a flowable and curable material.

In certain embodiments, the renewed pipe structure pair comprises:

a host pipe, and a binary tubular composite structure, comprising two of the following tubular assemblies, from innermost surface to outermost surface:

(a) a sealing layer, (b) one or more axial reinforcement layers, (c) a hoop reinforcement layer, and (d) a protective layer;

each tubular assembly optionally further comprising a sensor array layer; and the tubular composite structure optionally further comprising an interspatial annular cylinder between the two tubular assemblies; and the renewed pipe structure pair further comprising an interspatial annular cylinder between the outer surface of the outermost tubular assembly and the inner surface of the host pipe.

In certain embodiments, the TCS further comprises an interspatial annular cylinder between the two tubular assemblies. In certain further embodiments, the interspatial annular cylinder between the two tubular assemblies contains a flowable, and optionally curable, material. In certain further embodiments, the interspatial annular cylinders between the two tubular assemblies contains a flowable and curable material.

In certain embodiments, the renewed pipe structure pair comprises:

a host pipe, and a binary tubular composite structure, comprising the following concentric tubes, from innermost surface to outermost surface:

(a) a first sealing layer, (b) a first axial reinforcement layer, (c) a first hoop reinforcement layer, (d) a first protective layer, (e) an optional interspatial annular cylinder, (f) a second sealing layer, (g) a second axial reinforcement layer, (h) a second hoop reinforcement layer, and (i) a second protective layer;

the binary tubular composite optionally further comprising one or more sensor array layers; and the renewed pipe structure pair further comprising an interspatial annular cylinder between the outermost protective layer of the outermost tubular assembly and the inner surface of the host pipe.

In certain embodiments, the TCS comprises (e) an interspatial annular cylinder between (d) the first protective layer and (f) the second sealing layer. In certain further embodiments, the (e) interspatial annular cylinder contains a flowable, and optionally curable, material. In certain further embodiments, the (e) interspatial annular cylinder contains a flowable and curable material.

In some embodiments, the interspatial annular cylinder between the outer surface of the outermost tubular assembly and the inner surface of the host pipe in the renewed pipe structure pair contains a flowable, and optionally curable, material. In some embodiments, the interspatial annular cylinder between the outer surface of the outermost tubular assembly and the inner surface of the host pipe in the renewed pipe structure pair contains a flowable and curable material.

In some embodiments, the sealing layer is made from plastic sheet materials. In some embodiments, the sealing layer is chosen from ABS, PE, HDPE, UHMWPE, Nylon, PEEK, PET, PSS, PDA, PLA, PLLA, PPL, ETFE, polycarbonate, and polyurethane. In some embodiments, the sealing layer is chosen from reinforced PEEK or nylon. In some embodiments, the sealing layer has been radially etched.

In some embodiments, the axial reinforcement layer is chosen from aramid fiber, unidirectional fiberglass, carbon fiber, Kevlar, or HDPE fabric. In some embodiments, the axial reinforcement layer is chosen from chosen from any one of aramid fiber, unidirectional fiberglass, carbon fiber, Kevlar, or HDPE fabric which has been pre-impregnated with a material chosen from epoxy, polyurethane, polyolefin, and EVA.

In some embodiments, the axial reinforcement layer comprises carbon fiber micro-ropes or carbon fiber graphene hybrid micro-ropes. In some embodiments, the axial reinforcement layer comprises carbon fiber micro-ropes fabricated out of carbon fiber tow or carbon fiber graphene materials. In some embodiments, the micro-ropes are twisted or braided. In some embodiments, the micro-ropes are twisted or braided into filaments. In some embodiments, the micro-rope filaments are bonded to each other. In some embodiments, the micro-rope filaments contain 2-80 individual twisted micro-ropes affixed together. In some embodiments, the micro-rope filaments are bonded to each other with EVA or a similar resin. In some embodiments, the micro-rope filaments are bonded to each other with EVA resin.

In some embodiments, the hoop reinforcement layer comprises twisted carbon fiber tow or twisted carbon fiber graphene hybrid micro-ropes. In some embodiments, the hoop reinforcement layer comprises unidirectional carbon fiber, glass fiber, Kevlar, aramid, or polyethylene fibers.

In some embodiments, a tubular assembly in a TCS contains one or two hoop reinforcement layers. In some embodiments, tubular assemblies in a TCS contains one or two hoop reinforcement layers. In some embodiments, a tubular assembly in a TCS contains one hoop reinforcement layer. In some embodiments, tubular assemblies in a TCS contains one hoop reinforcement layer.

In some embodiments, the protective layer is a fiber reinforced plastic. In some embodiments, the protective layer is a high slip material. In some embodiments, the protective layer is impregnated with a high-slip coating. In some embodiments, the protective layer is reinforced with aramid fabric. In some embodiments, the protective layer is an abrasion resistant material. In some embodiments, the protective layer comprises a material chosen from nylon, tear-resistant PTFE coated fiberglass fabric, and polyethylene. In some embodiments, the protective layer further comprises a polyolefin. In some embodiments, the composition of the protective layer promotes shrinkage and compression upon heating. In some embodiments, the protective layer is compressed after application. In some embodiments, the protective layer is compressed after application using heat. In some embodiments, the protective layer is compressed after application, thereby immobilizing one or more components below the protective layer. In some embodiments, the protective layer is compressed after application, thereby immobilizing a sensor array layer below the sealing layer.

In some embodiments, the flowable and optionally curable material is a flowable and curable material. In some embodiments, the flowable and curable material is a two-component formulation. In some embodiments, the flowable and curable material is chosen from traditional epoxies, polyurethanes, and acrylics. In some embodiments, the two-component formulation of the flowable and curable material is chosen from acrylamide group, acrylate grout, and an approved equal. In some embodiments, the two-component formulation of the flowable and curable material is chosen from acrylamide group and acrylate grout. In some embodiments, the flowable and curable material, when cured, results in a gelatin-like material. In some embodiments, the flowable and curable material, when cured, results in a ballistic gel.

Also disclosed herein are methods for renewing a segment of host pipe, the methods comprising the steps of:

(I) fashioning a tubular composite structure as disclosed herein; and (II) fitting the tubular composite structure within the interior of the host pipe.

In certain embodiments, the method for renewing a segment of host pipe is performed in the field.

In certain embodiments, the method for renewing a segment of host pipe is performed on a pipe containing a liquid or gaseous medium. In certain embodiments, the liquid or gaseous medium is pressurized. In certain embodiments, the liquid or gaseous medium is flowing. In certain embodiments, the method for renewing a host pipe is performed on a pipe containing a flowing liquid or gaseous medium while substantially maintaining flow in the pipe.

In certain embodiments, the method for renewing a segment of host pipe containing a flowing liquid or gaseous medium further comprises the steps of:

identifying a length ("pup") of the host pipe for removal on the upstream side of the segment of host pipe;

attaching two hot tap/line stop fixtures to the host pipe, external to either end of the pup;

installing two relief valves, internal to each of the two hot tap/line stop fixtures and external to either end of the pup;

installing a flow bypass conduit between the two hot tap/line stop fixtures;

installing a flow restricting plug into the host pipe at each hot tap/line stop fixture, internal to the flow bypass conduit;

inflating the flow restricting plugs, thereby diverting the flowing liquid or gaseous medium into the flow bypass conduit;

opening the two relief valves, thereby relieving any pressure between the hot tap fixtures;

removing the pup from the host pipe, thereby creating two openings in the host pipe;

inserting a sealing flange in the downstream opening in the host pipe;

deflating the downstream flow restricting plug;

removing the downstream flow restricting plug; and inserting a tubular composite structure into the host pipe via the sealing flange.

In certain embodiments, the method for renewing a segment of host pipe containing a flowing liquid or gaseous medium further comprises the steps of:

identifying lengths ("pups") of the host pipe for removal on either side of the segment of host pipe;

at each pup, performing the following steps:

attaching two hot tap/line stop fixtures to the host pipe, external to either end of the pup;

installing two relief valves, internal to each of the two hot tap/line stop fixtures and external to either end of the pup;

installing a flow bypass conduit between the two hot tap/line stop fixtures;

installing a flow restricting plug into the host pipe at each hot tap/line stop fixture, internal to the flow bypass conduit;

inflating the flow restricting plugs, thereby diverting the flowing liquid or gaseous medium into the flow bypass conduit;

opening the two relief valves, thereby relieving any pressure between the hot tap fixtures; and removing the pup from the host pipe, thereby creating two openings in the host pipe;

inserting a tubular composite structure into the host pipe via the sealing flange.

In certain embodiments, the hot tap/line stop fixture is a single mechanism. In certain further embodiments, the line stop functionality of each hot tap/line stop fixture is oriented interior to the hot tap functionality of each hot tap/line stop fixture at each pup.

In certain embodiments, the hot tap/line stop fixture contains two separate mechanisms. In certain further embodiments, the line stop mechanism is placed interior to the hot tap mechanism at each pup.

In certain embodiments, the method for renewing a segment of host pipe further comprises the step of one or more installing carbon fiber bend sleeves at structurally sensitive areas. In certain embodiments, the structurally sensitive areas are bends.

Also disclosed herein are methods for storing media, the methods comprising the steps of:

provide a subterranean bore-hole in the ground and/or bedrock; and inserting a TCS, as described herein, into the borehole.

In certain embodiments, the TCS is chosen from a single TCS or a binary TCS. In certain embodiments, the radius of the TCS is between 8 inches and 12 feet. In certain embodiments, the borehole is substantially vertical. In certain embodiments, the borehole is substantially linear. In certain embodiments, the TCS extends to a depth of up to 20,000 feet. In certain embodiments, the TCS extends to a depth of up to 10,000 feet. In certain embodiments, the TCS extends to a depth of up to 5,000 feet. In certain embodiments, the TCS extends to a depth of up to 2,000 feet.

Also disclosed herein is a mobile onsite factory ("MOF"), comprising a means for fashioning a sealing layer from plastic feedstock.

In certain embodiments, the MOF is housed in a customized intermodal container. In certain embodiments, the MOF can be loaded onto a flatbed truck. In certain embodiments, the MOF can be loaded onto a barge.

In certain embodiments, the MOF comprises a means for fashioning a sealing layer from flat thermoplastic sheet feedstock.

Also provided herein is a MOF which directs the manufactured TCS downward into a subterranean bore-hole.

Abbreviations

ABS=acrylonitrile butadiene styrene plastic; AI=artificial intelligence; BTCS=binary tubular composite structure; ETFE=Ethylene tetrafluoroethylene; FAME=fatty acid methyl ester; ID=inside diameter; MOF=mobile onsite factory; OD=outside diameter; PDA=poly(diacetylene); PE=polyethylene; UHMWPE=ultra high molecular weight polyethylene; HDPE=high density polyethylene; ML=machine learning; PEEK=Polyether ether ketone; PLA=poly(lactic acid); PLLA=poly(L-lactic acid); PPL=poly(polypropiolactone); PSS=poly(styrene sulfonate); TCS=tubular composite structure; TDC=track drive carrier; UT=ultrasonic.

Definitions

The term "annulus", as used herein, alone or in combination, refers to a region between two concentric circles. The term "annular cylinder", as used herein, alone or in combination, refers to a region between two concentric cylinders. The term "interspatial annular cylinder", as used herein, alone or in combination, refers to an empty region between two concentric cylinders. In some embodiments, the interspatial annular cylinder can be filled with a liquid. In some embodiments, the liquid within an interspatial annular cylinder can then be cured, to form a solid, gel, or semi-solid.

The term "concentric" as used herein, alone or in combination, refers to two circular or tubular structures which share approximately the same center. The term "concentric" will also refer to two tubes which share approximately the same center, both of which tubes then form a coiled geometry.

The term "tubular assembly", as used herein, alone or in combination, refers to an assembly of concentric tubes. In some embodiments, a tubular assembly comprises, from innermost surface to outermost surface: (b) one or more axial reinforcement layers, and (c) one or more hoop reinforcement layers. In some embodiments, a tubular assembly comprises, from innermost surface to outermost surface: (a) a sealing layer, (b) one or more axial reinforcement layers, and (c) one or more hoop reinforcement layers. In some embodiments, a tubular assembly comprises, from innermost surface to outermost surface: (b) one or more axial reinforcement layers, (c) one or more hoop reinforcement layers, and (d) a protective layer. In some embodiments, a tubular assembly comprises, from innermost surface to outermost surface: (a) a sealing layer, (b) one or more axial reinforcement layers, (c) one or more hoop reinforcement layers, and (d) a protective layer. In some embodiments, a tubular assembly further comprises one or more sensor array layers.

The term "tubular composite structure" ("TCS"), alone or in combination, refers to a structure containing 1, 2, 3, 4, or 5 concentric tubular assemblies. The tubular assemblies may be the same or different. In some embodiments, the tubular composite structure comprises one or more interspatial annular cylinder between adjacent tubular assemblies.

The term "binary tubular composite structure" ("BTCS"), alone or in combination, refers to a structure containing 2 concentric tubular assemblies. The tubular assemblies may be the same or different. In some embodiments, the tubular composite structure comprises an interspatial annular cylinder between the two tubular assemblies.

Usages

While not intending to limit the applicability of the methods and manufactures disclosed herein, the following possible usages are contemplated:

Pipeline renewal The methods and manufactures disclosed herein may be applied for the renewal of existing pipes. This process is necessary for pipes that are either in the process of failing, or in danger of failing in the near future. This process is necessary for pipes composed of materials that are not resistant to hydrogen permeation or diffusion. Methods directed at pipeline renewal envision inserting a tubular composite structure into an existing pipeline. The newly inserted structure will provide the necessary mechanical support, structural integrity and resistance to transmitted media for continued use of the pipeline. Certain methods disclosed herein also allow for renewal of the pipeline without the need for interruption of flow in the pipeline. Pipeline renewal usage also includes repurposing of existing pipes for transport of new gases or liquids, or mixtures thereof. By way of example only, a pipeline intended for transport of natural gas may be repurposed for the transport of mixtures of natural gas and hydrogen gas, high purity hydrogen gas, or liquid hydrogen.

Coiled storage The methods and manufactures disclosed herein may be applied for the onsite storage of liquid or gaseous feedstocks. Methods directed at pipeline renewal envision manufacturing a tube composite structure and providing the structure in a coiled geometry. This usage may allow, e.g., utility and power generation companies to supplement their reserves of fuels.

Standalone The methods and manufactures disclosed herein may be applied for the manufacture of tube composite structures that are intended for transport of liquid or gaseous medium as-is, e.g., without insertion of the structure into an existing pipeline. Disclosed herein are methods and manufactures suitable for this usage.

Tubular Composite Structure ("TCS")

The tubular composite structures disclosed herein offer major improvements over current and lesser tubular storage, tanks, caverns, pipeline renewal and standalone pipeline structures. The tubular composite structure can be manufactured with a continuous manner via methods described herein. The resulting continuous tubular structure significantly reduces the requirements for butt joint splicing, bell and spigot or mechanical couplers as it the case with current off the shelf cylinder material methodologies. In contrast, current available pipeline renewal, storage and standalone systems require connection of off the shelf pipes with fusion welds, wedge welds, metal welds, or flanges. These connections are the most vulnerable areas in the structure to fatigue, corrosion, embrittlement, and rupture as they are unreinforced and realize a great portion of the strain concentration imposed by internal fluid or gas pressure. For this reason, these current systems require significantly thicker walls, adding to expense and weight and significantly reducing flexibility. The continuous nature of the tubular composite structures disclosed herein, whose manufacture does not require connection of individual pipes, circumvents these problems.

Utilization of flat thermoplastic sheet feedstock materials by the methods and manufactures disclosed herein represents a significant improvement over current technologies such as smart-pipe and significantly reduces the shipping and handling cost as is associated with other current storage, pipeline renewal and standalone pipe technologies. As an example, comparative to current methodologies such as HDPE slip lining for pipeline renewal the material is delivered to the jobsite in the form of a prefabricated pipe, typically in lengths of 40 ft. to 60 ft. long. To install in just one mile of 10 inch host pipe it would take 375 pieces of 40 ft. pipe or more specifically, 18 semi truckloads of materials to and from the jobsite to complete the project. Using the flat feed stock methodology for the methods as described herein, it would only take one half truckload or only one delivery round trip for the flat plastic feedstock to complete the same mile of host pipe. In the example the tubular composite structure system reduces shipping/handling costs and overall carbon footprint by a factor of 18×. Furthermore, there are also significantly reduced handling costs, and carbon emissions with the manufactures as describe herein. This is due to the minimal requirement to only unload and place only one spool of material onsite as opposed to unloading, placement and the continued placement of 375 pieces of 40 ft. HDPE pipe. Furthermore, with this highlighted pipeline renewal methodology, these pipe sections need to be constantly moved from the laydown area to near the installation access for butt welding, thus also significantly increasing the costs as well as carbon emissions from the heavy equipment required for this significant material handling process. The above comparison example is also directly applicable to onsite storage systems utilizing steel or plastic pipe as well as standalone steel, HDPE or PVC tubular structures for new buried or elevated pipelines. Furthermore, the methods as described herein can ultimately produce a tubular composite structure that is significantly lighter than steel or HDPE prefabricated tubular structures. Highlighting the example above, the same 10" pipe manufactured out of steel would weigh approximately 64 lb./ft. and one manufactured out of HDPE would weigh approximately 15 lb./ft. as compared to the composite tubular structure disclosed herein, which weighs approximately 2.7 lb./ft. While this structure realizes a factor of more 4× in reduced weight, this same structure can resist as much as 30× the internal pressure, compared to the other materials. These significant reductions in both weight and weight-to-strength ratio drastically reduce the intensity of material shipping, handling, and assembly while also reducing the carbon emissions created in their manufacture, shipping, handling, and assembly processes.

The utilization of flat plastic sheet feedstock for this methods described herein also allows for the improvement of using thinner flat stock materials for onsite manufacturing, as compared to current methods that utilize and connect prefabricated pipe sections. Current methods can utilize only the nominal thicknesses and lengths that are available in the "off the shelf" marketplace. Additionally, since these methodologies only utilize one monolithic or continuous thickness/layer of material for sealing and watertightness, hoop resistance (internal pressure load) and bucking resistance (soil/hydrostatic load), their structural design requires considerably thick walls to meet these design considerations.

The use of rolled plastic flat sheet stock for this methods described herein, coupled with the methodology of inserting or over molding one TCS into or over the other TCS as part of or during the manufacturing and/or installation process, achieves both the cohesive and cumulative thickness and resistance of the sealing layers and the cohesive strength and structural enhancement of the post installation flowable materials as required by the structural design, while at the same time utilizing thinner watertight materials in each sealing layer. Furthermore, the design of the system is a significant improvement over current technologies, in that the design highly mitigates the tension or hoop stresses imposed on the sealing layer. The tubular composite structure is unlike the materials and methods described above such as HDPE pipe, PVC, CIPP, etc. where the sealing of watertight layer or composition is required to resist all internal and external loads as well as maintain watertightness. The sealing layer or water-tightness component of the TCS is constrained by the hoop reinforcement layer, thus significantly diluting the hoop or tension stresses applied to the material. Due to the TCS design, the sealing layer material will be under compression, and not tension, when the tubular structure is subjected to internal pressure. Again, this is a major improvement over all current pipe renewal, storage, and standalone methodologies as it allows utilization of nearly any thermoplastic material for the sealing layer, affording significantly increased design life and versatility.

The methods and manufactures disclosed herein can reduce the weight of each tubular composite structure. For pipeline renewal and standalone pipe usages disclosed herein, this improvement increases the overall distance the TCS can be pulled into the host pipe. Additionally, this improvement significantly increases the flexibility of each TCS to traverse through nonconcentric diameters, undulations, and bends in the host pipe. Moreover, and more importantly to the fundamental premise of the TCS concept disclosed herein, the flat feedstock manufacturing methodology affords for the use of any commercially available material composition, or any material that can be extruded into flat sheet stock form, making the manufactures disclosed herein significantly more versatile than current methods which have very limited material compositions available for use. The versatility of sealing layer feedstock can also significantly increase utilization of recycled, bio-based and renewable materials for the manufacture of the TCS structures, providing for an overall reduction in carbon emissions One if not the most critical drawback of existing pipeline renewal technologies for pull and/or push in place systems, such as HDPE or PVC slip lining, is their inability to navigate, traverse and line pipe with slight bends or undulations. In these instances, these methods require a significant increase in the annular space between the tubular structure and the ID of the host pipe, which reduces the cross-sectional diameter/flow area, and thus significantly reduces the hydraulic capacity of the renewed pipe system. Another benefit to using flat plastic feedstock, over current pull-in-place pipeline renewal technologies, is the ability to use varied thicknesses of sheet stock material to facilitate onsite manufacturing of composite cylinders for navigating and lining multiple and/or short radius bends in pipelines. Again, current methods require the utilization of considerable wall thickness, highly restricting installation for pipelines with long or short radius bends and/or multiple bends and/or undulations. Current methods are typically confined to a bending radii of approximately 28 feet or larger. The methods and manufactures disclosed herein can utilize thinner fiber reinforced flat sheet feedstock material such as reinforced PEEK or Nylon or similar that has been pre-etched radially for corrugation or radially etched in the onsite manufacturing process. This process can provide a highly flexible reinforced tubular composite system capable of navigating and lining multiple short radius bends. While the material compositions and radial etching methodologies disclosed herein will reduce the overall buckling resistance of the installed TCS, post installation injection and pressurization of flowable, and optionally curable, material in the interspatial annular cylinders can afford the original and designed structural integrity of the tubular composite structure post installation. In some instances, for larger diameter and exceedingly high internal pressure transmission pipelines this process would also be utilized for short radius and/or multiple bends. In certain methods disclosed herein, a sleeve comprising carbon fiber can be remotely and robotically located in bend areas, post installation of the TCS, thereby significantly augmenting the TCS structure in these areas of increased strain. This carbon fiber bend sleeve can be installed by the robotic device described below for remote installation of carbon fiber terminations on the TCS.

Sealing Layers

The sealing layers are functional layers installed and located on the innermost surface of each tubular assembly in the tubular composite structure. The sealing layers provide watertightness, and act as a redundant leak safeguard and for increasing the buckling resistance in the final cohesive composite structure.

Since the hoop reinforcement layer, described below, provides exterior reinforcement of the sealing layer, outward strain applied to the sealing layer due to internal fluid or gas pressurization during service the sealing layer is completely constrained from causing separation, damage, or rupture by the hoop reinforcement layer. The sealing layer material is therefore only subjected to compression, to which it has a high resistance. This design parameter ensures that any short term, long-term or transient loading on the sealing layer material and the seam is far below the material's physical properties thus eliminating any potential for separation, creep, cracking or rupture as well as significantly mitigating long term material fatigue as is prevalent with current and lesser pipeline renewal technologies.

The sealing layers can provide an impermeable barrier to the material conveyed inside the tubular composite structure, and can be made from materials with specific resistance and non-adherence to the media being transmitted or stored in the structure. Embodiments containing from one to five tubular assemblies, each containing a sealing layer on the innermost surface of each tubular assembly, are contemplated in this disclosure, depending on the required pressure resistance and/or the required number and types of flowable, and optionally curable, materials in the interspatial annular cylinder. The most internal sealing layer may also be constructed of materials that are highly hydrophobic and/or oleophobic to allow for the release of media when cleaning or batching different medias to significantly reduce FAME and contaminants.

Individual sealing layers on different tubular assemblies can be made from different materials. Sealing layers can be made from plastic sheet materials. By way of example only, the plastic sheet material can be chosen from ABS, PE, HDPE, UHMWPE, Nylon, PEEK, PET, PSS, PDA, ETFE polycarbonate, and polyurethane. By way of example only, the plastic sheet material for hydrogen transmission may be recycled and modified PET or polymeric nanocomposite with an organo-modified clay additive. In certain embodiments, thinner fiber reinforced flat sheet feedstock material such as reinforced PEEK or Nylon or similar that has been pre-etched radially for corrugation or radially etched can be employed. Methods disclosed herein may utilize highly reinforced plastics and metal sheet stock. Material for the sealing layer in the innermost tubular structure of the TCS may be chosen based on one or more of the following variables: cost, non-adherence, chemical or erosion resistance to the transmitted pipeline media, modulus for buckling resistance, and (when applicable) heat resistance to the application of cold spray metalizing and thermal processes or resistance to the pipeline media. Unlike current and lesser methods, and in consideration of the flat sheet material feedstock methodology utilized in the materials and methods disclosed herein, the ability to utilize any material composition affords the capability to also utilize recycled plastics and bio-based materials, which will significantly reduce the overall carbon footprint of the manufactures, their manufacture and the installation equipment and methodologies disclosed herein. While the methods and manufactures disclosed herein retain the capability to use traditional petroleum polymerization derived materials such as HDPE or a hybrid of these traditional materials and recycled or bio-based materials, they can also utilize a high fraction of recycled, bio-based, and low emission materials. In some embodiments, recycled, bio-based, and low emission materials constitute 50% or more of the materials used in a method or manufacture. In some embodiments, recycled, bio-based, and low emission materials constitute 75% or more of the materials used in a method or manufacture. In some embodiments, recycled, bio-based, and low emission materials constitute 90% or more of the materials used in a method or manufacture.

By way of example, recycled, bio-based, and low emission materials that may be used in the methods and materials disclosed herein may include recycled materials such as polyethylene terephthalate (PET) plastic, including PET from recycled water bottles and other PET and similar recycled plastics and products. Additionally, bio-based materials that may be used in the methods and materials disclosed herein may include but are not limited to: PLA homopolymers (polylactic acid) and variants, such as PLLA, PPLA or "green" high density polyethylene. Many of these augmented bio-based and recycled materials have high dimensional stability, impact, moisture, alcohol and solvent resistance and often higher mechanical properties than their traditional petroleum-based counterparts. This makes them ideal for utilization in these tubular composite systems disclosed herein, and in turn be part of solution for carbon reducing and carbon neutral technologies. By example, the efficacy of carbon reductions made possible by the methods and manufactures disclosed herein, in only one mile of 12 inch diameter of TCS the entire structure TCS would utilize the recycled materials from nearly 3.5 million-12-ounce plastic water bottles or the sequestering of 20 tons of carbon dioxide in its manufacture. It should be noted again that, by design, all past and current pipeline renewal, storage, or standalone systems cannot utilize these low carbon emission materials due to the "off the shelf" prefabricated cylinders or pipes that are used as the foundation of the processes, with recycled and bio-based compositions not being commercially available.

Axial Reinforcement Layers

The axial reinforcement layers are functional layers, imparting axial reinforcement, applied to the OD of the sealing layer in one or each tubular assembly in the TCS. Specific to the pipeline renewal usages disclosed herein, this axial reinforcement will resist the tensile stresses during the process of pulling the TCS through the host pipe. Furthermore, in all usages disclosed herein, the axial reinforcement layers also provide axial reinforcement and strength to the TCS to resist axial loading created by internal pressure.

The axial reinforcement layers can be made of any material that provides the required reinforcement. Individual axial reinforcement layers on different tubular assemblies can be made from different materials. By way of example only, the material can be chosen from aramid fiber, unidirectional fiberglass, carbon fiber, Kevlar, or HDPE fabric with or without pre-impregnated materials, such as epoxy, polyurethane, polyolefin, and EVA. Most generally, the axial reinforcement layer will be made of individual twisted or braided carbon fiber micro-ropes or twisted or braided carbon fiber graphene hybrid micro-ropes aligned sequentially into filaments and bonded to each other with EVA or similar resin. These micro-rope filaments typically contain 2-80 individual twisted micro-ropes affixed together and be between 0.25 inches and 20 inches wide and approximately 0.30 inches and 1 inch in thickness. The micro-ropes can be fabricated out of carbon fiber tow or carbon fiber graphene materials from 5k to 60k which are twisted to a specific torsion and orientation to increase the alignment and the subsequent strength of the micro-rope and subsequently the filament by assuring each strand is subjected uniformly when under strain. These micro-rope filaments can be bonded together longitudinally with EVA resin to create a sheet fabric. These micro-rope filaments can be bonded together to form a filament or tape. This filament or tape can be uniformly distributed along the axis of the liner.

Hoop Reinforcement Layers

The hoop reinforcement layers of the tubular composite structure are functional reinforcement layers applied helically to encircle the axial reinforcement layer for providing high resistance to hoop stresses created in the tubular composite structure from internal pressure. This layer most typically will be made from twisted carbon fiber tow or twisted carbon fiber graphene hybrid (micro-ropes); however, unidirectional carbon fiber or glass fiber, Kevlar, aramid or polyethylene fibers can be used as an iteration of this embodiment. The hoop reinforcement layer is wound over the axial reinforcement layer by way of external winders with storage spools. For applications that require additional hoop reinforcement, more than one hoop reinforcement layer can be incorporated into a tubular assembly. The more than one hoop reinforcement layers can be located adjacent or non-adjacent to each other.

Sensor Array Layers

The sensor array layers are one or more optional functional layers embedded within the TCS that can provide data acquisition capabilities for instantaneously reporting changes in, for example, temperature, pressure, flow, tension, fatigue, wall thickness, and/or corrosion, as well as other acoustic indicators such as movement like seismic events and approaching third-party activities. The embedded sensor array can provide continuous monitoring of the tubular composite structure for structural health. The sensor array layer can be composed of fiber optics, communication cable, temperature, gas, and vibration sensors, chemical reaction sensors, and gas chromatography-mass spectrometry etc. for a variety of gas and liquid transmitted media. The sensor array layer will utilize discrete acoustic sensing devices combined with AI and ML classification and localization frameworks that allow for development of pattern recognition schemes for infrastructure security, faults, leaks, ruptures, etc. The AI and ML fusion platform will afford remote simulated finite element analysis of both the host pipe and the liner system in real time for monitoring the health of the entire system.

In some embodiments, a sensor array layer is embedded on the exterior of a hoop reinforcement layer. In some embodiments, a sensor array layer is embedded on the exterior of an axial reinforcement layer. In some embodiments, a sensor array layer is located on the interior surface of a protective layer. In some embodiments, a sensor array layer is located on the exterior surface of the scaling layer.

The present disclosure contemplates tubular composite structures containing zero or one sensor array layers in each tubular assembly. A binary tubular composite structure may therefore contain zero, one, or two sensor array layers. In some embodiments, the tubular composite structure contains a sensor array layer in the innermost tubular assembly, intended for monitoring events within the structure, such as leakage of the contents. In some embodiments, the tubular composite structure contains a sensor array layer in the outermost tubular assembly, intended for monitoring events outside of the structure, such as seismic events and third-party activities.

Depending on application type and potentially hazardous conditions of effluent or area, and in contrast to lesser pull in place liner systems such as smart-pipe, a TCS that comprises a sensor array provides far more comprehensive data to the operator. The sensor array layer disclosed herein is an intelligent and proactive system as it is embedded within the redundant leak and failure safeguards that are intrinsic to the tubular composite structure. This allows for increased surface area of the sensors and exacting data and feedback associated with the pipeline media. In one embodiment, the system utilizes an embedded artificial intelligence, affording high speed or even real time data computation for feedback systems. A significant advantage of the known AI computational capabilities is affording exact location and specific event data, allowing the system to either manually or autonomously enact proper event control such as valve actuations. By comparison, data acquisition systems for current pull-in-place pipeline renewal systems are reactive, in that an event may be reported to the operator only after a failure or leak has already taken place. In such circumstances, the ability to circumvent, e.g., an explosive event, is very limited. Current and lesser pipeline renewal systems do not possess redundant or any leak/failure safeguards, as they are a single sealing layer cylinder without interspatial containment-if the sealing layer fails anywhere in the pipeline renewal system, there is a potential for a catastrophic environmental and/or human safety event. Conversely, with the methods for proactive data acquisition disclosed herein, early notification to the operator of a pending potential failure event, combined with the intrinsic redundant leak safeguards for containment of the potential leak, allows a much longer interval for thorough data analysis and execution of any necessary preventative action. Thus, early warning of potential failure, combined with robust leak mitigation, highly reduce the potential for catastrophic environmental or explosive events.

Protective Layers

The protective layer is a functional layer applied on the exterior of the hoop reinforcement layer to provide protection of sensor array layer as well as all interior layers during the installation process. This layer can be made of fiber reinforced high strength materials with high slip and abrasion resistant properties, including but not limited to nylon, tear-resistant PTFE coated fiberglass fabric, and polyethylene, depending on the application. The layer can be reinforced with aramid fabric. The layer can be impregnated with a high-slip coating. Inclusion of polyolefin or like compounds in a formulated composition can promote thermal shrinkage and compression of the protective layer during manufacture.

For some pipeline renewal usage applications, radial etching of the outside layer provides increased flexibility for complex pipeline configurations, expansion loops and/or short radius bend installations. Positioning of the TCS, made possible by the increased flexibility, is then followed by injection and curing of flowable and curable material, providing the required rigidity and mechanical strength.

Terminations

For coiled storage and other standalone usages, mechanical fittings can be used on the tubular composite structures to seal these terminations while also facilitating the connection to other pipe system for filling, evacuating, venting, and stabilizing of the structure. At the opposing end of the TCS, a mechanical seal with injection ports is aligned to the interspatial annular cylinders and affixed to the structure OD.

Interspatial Annular Cylinders/Flowable Material

In an exemplary embodiment, all interspatial annular cylinders throughout the length of the tubular structure are filled with a flowable, and optionally curable, material for cohesion, increased buckling resistance, strain shielding, exterior void filling/pipe stabilization and redundant leak safeguards.

Upon full cure, the flowable and curable material in the external interspatial annular cylinder can provide a critical functionality for the pipeline renewal usage disclosed herein. This cured material possesses a consistency of that of ballistic gel throughout its design life. This low Poisson's ratio cured material suspends the TCS in the host pipe, thereby shielding and absorbing the transference of strain from the pipe substrate during host pipe failure, bending, or seismic events. Furthermore, this special characteristic can also prevent the TCS from fatigue while cracking, fracture and other types of corrosion or movement related damages are imposed on the host pipe. By example, in the event the host pipe suffers a through wall longitudinal crack, the TCS can survive, as the cured material will compress, expand, and may even become temporarily sacrificial to protect the TCS from the strain, thus preventing a catastrophic leak event as would happen with other lining technologies that are adhered or close fit to the host pipe substrate. When a structural lining material is adhered to the host pipe substrate either through mechanical, chemical, or frictional bonding and the pipe experiences a failure event such as cracking, the strain then becomes nearly infinite on the lining material creating fatigue or failure. In contrast to systems which employ rigid mechanical or frictional adherence between the host pipe and lining, the compression, expansion, and delamination characteristics of this gelatin material can prevent large displacements of the cracking pipe from transference onto the TCS, thus minimizing damage or fatigue of the structure. The cured material layer can also afford flexibility, allowing the TCS to move slightly axially and radially between terminations inside the host pipe even under high internal pressure loading without damaging or fatiguing the TCS. This effect minimizes the risk of TCS failure due to transient axial loading, unexpected deformations, or bending or failure events of host pipe due to soil cycling or seismic events.

In the absence of the gelatin material, the interface between the TCS and the host pipe is nearly cohesive when the pipe is pressurized, due to friction. With suspension of the lining composite in this structure, this situation is remedied. Even under internal pressure, the gelatin material has enough flexibility to create a differential in inter-laminate stresses. The gelatin material, even when compressed, will still allow for extensional, transformational, and compressional movement of the pipe different than that applied to the structural composite materials in the TCS system.

This will hold true for perforations, cracks (radial or longitudinal), beam bending (bending load), traverse shear events, seismic events etc. Additionally, the flowable and curable material can be mixed with of an elevated pH composition, so as to fill and seal any existing pinholes or microcracks in the host pipe wall. This material can also inhibit internal and external corrosion and can mitigate further damage to the pipeline structure.

Certain tubular composite structures utilize glass bubble insulation as a high ratio additive to the flowable material or utilized as the sole agent in the process. The glass bubble material provides a low viscosity such as that of water and results in and is manufactured specifically for a highly efficient insulation for the cryogenic transmission and storage of liquid nitrogen.

Certain tubular composite structures disclosed herein are suitable for transmission of liquid hydrogen, due to their long-term resistance to highly elevated internal pressures and increased safety and hydraulic capacity. Certain embodiments of these structures, in particular those intended for pipeline renewal usages, may therefore include insulating material in one or more interspatial annular cylinders, in order to mitigate boil-off. Certain further embodiments can incorporate a rigid material and glass bubble formulation within an interspatial annular cylinder, thereby providing even more insulative qualities to the structure.

Certain tubular composite structures disclosed herein can incorporate an adhesive matrix of glass fiber, polymer fiber or carbon fiber from 100 to 300 microns in length on the outside surface. Certain methods of manufacture disclosed herein can include application of the adhesive matrix to the outside surface of the protective layer. This adhesive matrix will provide fiber orientation for improved strength and modulus of the flowable material when injected into the interspatial annular cylinder post installation. The adhesive matrix will permit the flowable material to flow through the interspatial annular cylinder to rejection, while at the same time adding increased structural integrity to the material once cured. In contrast to mixing the fibers into the materials prior to pumping, as is standard practice in exterior coatings and cement, application of the adhesive matrix permits the flowable material to retain its low viscosity for pressure injection. The provided increase in strength and modulus to the flowable material will offer an option to increase the buckling resistance of the tubular composite structure system.

Over-Mold

Methods disclosed herein can comprise application of an over-mold reinforcement layer during the manufacturing process. In certain embodiments, incorporation of over-mold reinforcement layers can provide additional reinforcement without the need for assembling concentric multiple tubular composite structures. For example, these methods will be particularly useful for coiled storage usage, for which the tubular composite structure is manufactured with a predetermined minimum bend radius. Insertion of a second TCS within a first, coiled TCS, may be difficult or impossible, due to non-linear friction or capstan effect. For this reason, incorporation of an over-mold can provide the reinforcement that would otherwise be gained by providing a binary TCS system.

In an exemplary embodiment, the tubular composite structures disclosed herein have a minimum of one and a maximum of five tubular assemblies, with an interspatial annular cylinder between each pair of adjacent tubular assemblies. For pipeline renewal usages, whereby the structure is inserted into a host pipeline, an interspatial annular cylinder is also formed between the inner diameter of the host pipe and the OD of the structure. These interspatial annular cylinders are then filled with flowable, and optionally curable, material post installation.

A representative embodiment of the tubular composite structure includes the minimum of the following layers from innermost surface to outermost surface respectively:

1. Sealing layer
2. Axial reinforcement layer
3. Hoop reinforcement layer
4. Sensor array layer
5. Protective layer
6. Interspatial annular cylinder I
7. Sealing layer II
8. Axial reinforcement layer II
9. Hoop reinforcement layer II
10. Protective layer II
11. Interspatial annular cylinder II
   a. (optional) cold spray metalized, thermal or conventional protective coating layers on the internal and external surfaces of the tubular composite structure.
   b. (optional) second sensor array layer Specialty Coatings Also disclosed herein are materials and methodologies for applying specialty coatings, thermal and solid-state supersonic particle deposition onto any interior or exterior of the tubular structure. Methods described herein can provide traditional highly resistant thermoset coatings, thermal flame spray, austenitic metal and other metal coatings or films 360 degrees on the ID of the innermost sealing layer to protect the tubular assembly from contact with the transmission media. Methods described herein can provide traditional thermoset coatings, thermal coatings, austenitic and other metal coatings or films 360 degrees to the OD of the protective layer to increase buckling resistance, bending resistance, fireproofing, insulation, and resistance to weather events and vandalism. Methods described herein can also provide a second sealing layer on the tubular structure followed by placement of reinforcement over the surface to provide a double wall tubular composite structure. By way of example, for transport or containment of natural gas, natural gas/hydrogen, high purity hydrogen or liquid hydrogen, application of austenitic steel materials such as pure aluminum or nickel provides high resistance to long term hydrogen diffusion and embrittlement in high internal pressure pipeline systems as well as increased buckling and bending resistance to the composite structure. The cold spray process can be used for application of metalized powder at supersonic speed with the incorporation of heated gases such as nitrogen or helium to the inside surface of the sealing layer cylinder. The cold spray process allows for high purity aluminum or nickel or other metal powders to be applied radially at any thickness on the inside surface of the sealing layer. By way of example, application of a metal coating such as pure aluminum can afford long term resistance to diffusion of natural gas and hydrogen mixtures or to high purity hydrogen gas for high pressure transmission pipelines.

A similar process can be employed for TCS intended for coiled storage usages. In a first sequence, a TCS fabrication procedure would utilize a coating process to produce the sealing layer. In a second sequence, application of additional layers of axial and hoop reinforcement is applied to the TCS.

The application of metal films and coating also increase the buckling resistance of the sealing layer to future external or vacuum loading when lower modulus plastic materials are utilized for the sealing layer. The automated manufacturing process on the forming mandrel for the tubular composite structure affords this structure the capability to install multiple heated gas, fluid and power supply wires or rigid conduits through the center of the mandrel to the application nozzles at end of the mandrel. The mounting of the nozzle array shall be in the proximity to where the completed TCS exits from the mandrel and the interior surface is fully exposed radially.

The external surface is exposed for the application of cold spray applied metalized linings, coatings, and films prior to insertion of the tubular composite structure into the host pipe. This capability affords proximity of the cold spray supply equipment to the spray nozzles. More importantly this methodology affords the incorporation of multiple spray nozzles in a tight radial array. This provides overlapped and consistent material thickness deposition for a smooth surface profile without the requirement of a rotary spray nozzle as would be required in a remote spray applied system. The method overcomes the current numerous impediments that exist for to achieve the reliable and repeatable capability of fully rotational application of known cold spray technologies or other coatings through the supersonic particle deposition or traditional means. Additionally, since the interior surface of the completed tubular composite structure is no longer obstructed or constrained by the forming mandrel, the TCS can be autonomously clocked or rotated up to 120 degrees clockwise and counterclockwise directions. This TCS clocking capability can be interfaced in correlation and in synchronization with the nozzle orientations in the nozzle array. This improvement affords significantly increased surface coverage from fewer nozzles and more consistent coating thicknesses by spiraling the deposition patterns on the sealing layer surface. This also allows for more material flow to be supplied to the nozzles without the potential of poor or uneven surface profile and texture. It additionally significantly decreases the application time of the metalized material on the sealing layer. This inline longitudinal orientation of nozzle arrays with individual supply lines will afford a definitive increase in material flow and drastically reduced manufacturing and installation times of the tubular composite structure.

Forming Mandrel

The forming mandrel is a pipe-like structure on which a tubular assembly is assembled. The forming mandrel is cantilevered, i.e., it directly supported at only one end, allowing the tubular assembly, as it is being manufactured, to traverse the mandrel unhindered by supports. In some embodiments, additional support for the tubular assembly can be provided with rollers or similar devices external to both the forming mandrel and the tubular assembly. The sealing layer, once shaped into a cylinder and sealed, is drawn onto the mandrel. Preferentially, the OD of this tube is marginally smaller than the ID of the liner to be manufactured, allowing for the liner to slide along the mandrel axis during the onsite automated manufacturing process. The mandrel cantilevers through the various assemblies, such as spools and orbiting fixtures, for successively overlaying materials to the external of the growing tubular assembly.

In certain embodiments, the mandrel is substantially linear. The tubular assembly that is manufactured on such a mandrel can be expected to be substantially linear. In certain embodiments, the mandrel incorporates a curve. The tubular assembly that is manufactured on such a mandrel can be expected to incorporate a curve as well. Depending on the particular composition of a TCS, it will have a degree of flexibility; however, incorporation of a curve into a tubular assembly may be useful for certain usages, particularly for the coiled storage usage, for which incorporation of an intrinsic curve into the TCS may be beneficial.

The traversing speed of the tubular structure along the forming mandrel is predetermined from the dimensions of the tubular assembly and the feedstock, as well as from the required amount of hoop and radial reinforcement, and is adjusted to exactly meet the production speed of other processes, both upstream and downstream.

In some embodiments, intermittent tracked drive fixtures are placed between the winding and processing equipment. These tracked drive fixtures propel the tubular assembly along the mandrel from compression of the tubular assembly to the mandrel surface. The track drives are oriented in a circular configuration around the forming mandrel. When the tubular assembly is pulled into position on the mandrel and forward of the drive fixture, the drive fixture actuates electrically or pneumatically to compress the track drive belts against the surface of the tubular assembly. The drive fixtures can be speed controlled to precisely synchronize with the precise speed of the manufacturing process and the speed of the other drive fixtures, spools and pulling winch. This feature both provides propulsion of the tubular assembly along the forming mandrel as well as support for the forming mandrel. The track belts of drive fixtures can compress the tubular assembly in order to accept some of the load of the forming mandrel; however, due to drives being in axial motion the tubular assembly can continue to progress along the forming mandrel.

Various processing and quality control appendages can be located on the forming mandrel for modifying the internal surface of the tubular assembly. These modifications can include, but are not limited to: thermal spray seam overmolding, application of specialty coatings, and solid state supersonic particle deposition, often referred to as the "cold spray" process. Various processing and quality control appendages can also be located exterior to both the forming mandrel and the tubular assembly. Inline and radially oriented nozzle arrays can be located on the mandrel at the terminal end for spray application on the interior of the tubular assembly, with the feedstock for this spray application being provided by a centrally located and cantilevered supply conveyance conduit to affix and supply multiple inline and radially oriented nozzle arrays.

Nozzle arrays can also be located exterior to both the mandrel and the tubular assembly, for spray application to the exterior of the tubular assembly.

Additionally, a combined phase array flaw detection and thickness measurement sensors may be affixed and cantilevered forward of the nozzle arrays to provide real time flaw detection and thickness measurement of any coatings, linings or films applied to the sealing layer.

Manufacture of Sealing Layer

Manufacture of an individual tubular assembly proceeds down the mandrel, with the first step being formation of the sealing layer. Successive steps apply material to the exterior of the growing tubular assembly, with the exception of optional spray application to the interior of the tubular assembly at the end of the mandrel.

The plastic sheet material for the sealing layer can be precut for width, preferentially 2%-5% oversized in width compared to the required circumferential measure for the manufacturing process. The material can be delivered to the jobsite on large spools, and either stored onsite or loaded onto the mobile onsite factory ("MOF") described herein, to be utilized as manufacturing feedstock for the tubular composite structures disclosed herein. The sealing layer material is dispensed by pulling strap, and enters a stationary centering mechanism. This mechanism utilizes a series of long steel tubular rollers situated in a serpentine orientation. The length of the rollers is dictated by the width of the accumulator spool. These rollers may optionally be motorized for rotation to assist in unspooling the feedstock and to push the feedstock onto the forming mandrel.

The centering mechanism provides a static level wind system for centering the feedstock material through the trimmer/beveler mechanism and then further to an initial set of forming rollers for compressing and slowly forming the feedstock material into a tubular or cylindrical shape. The plastic feedstock material enters the centering mechanism at varying angles, governed by the width of the feedstock material, the width of the accumulator spool, and the horizontal positioning of the material to the spool face at any given rotation of the accumulator spool. As the feedstock material is pulled into the centering mechanism, the series of vertically opposing and staggered rollers guides the material to the center of the mechanism, since the flat pulling strap, which is attached to the center of the material, is at the exact centerline of the trimmer/beveler mechanism and the forming mandrel followed by the remaining automated manufacturing equipment. Once the material traverses through the final series of roller mechanisms, the centerline of the material aligns exactly with the centerline of the subsequent manufacturing equipment and processes.

The feedstock material then progresses through the trimmer/beveler mechanism. As the material progresses through the trimmer/beveler mechanism the outside edges of the material feedstock are mechanically trimmed to the exact width required for the radial measure of the sealing layer. This trimming process also incorporates a bevel or miter in the edge of the material of opposing angles on opposite edges. These opposing angles create a smooth mitered joint when the sealing layer is formed into a tubular structure and the seam is welded. By mitering the seam, the material overlaps itself thereby increasing the integrity of the weld.

Upon exiting the trimmer/beveler mechanism, the sealing layer material enters the shaper fixture. The concentric shaper fixture is a series of specifically oriented rollers oriented axially with a concentric and continuous reduction in radial aspect which compresses and subsequently rolls the feedstock material into a tubular structure of the specified internal diameter as it progresses onto the forming mandrel with the seam miter now aligned and compressed for welding and overlay.

For certain sealing layer material compositions and/or thicknesses, the material may be softened by heating the material to assist in the forming process. The material heating process if needed will be completed by an inline heater, autoclave, or similar system that is mounted on the spool cradle. Once the growing tubular cylinder is between the mandrel and the circumferentially oriented compression roller guides, the growing tubular cylinder finalizes to form the ID required for the sealing layer of the tubular assembly.

The tubular composite structure is fashioned with a continuous and monolithic longitudinal seam. The aligned and compressed seam is welded by fusion, UT or thermal welding processes, depending on the sealing layer material composition and the thickness of the material. Most generally UT welding will be used as it is the most expeditious and results in the highest integrity for most thermoplastic materials. The mechanical properties of the resulting seam will be equal to or greater than the mechanical properties of the bulk material, in order to assure the seam's strength and watertightness. As the now cylindrical sealing layer structure passes the welding process it is immediately coated on the internal side of the seam with a thermal spray of like material to increase the seam's integrity. The material utilized in the thermal spray process is preferably the same as the material used in the sealing layer in a thermoset composition, assuring a molecular bond and chemical crosslinking in the repair as opposed to simple adhesion. The thermal material is overlaid on the seam and cools to ambient temperature in 2-3 seconds. The sealing layer tubular structure then progresses along the forming mandrel a few inches where the seam is exposed to a phase array flaw detector. The detector inspects the seam for integrity parameters and requirements as set per specification. If the detector identifies a flaw in the seam, the manufacturing process is ceased, and quality control measures are initiated until the seam area passes inspections. The sealing layer then continues to traverse along the forming mandrel for the application of the axial reinforcement fabric.

Manufacture of Axial Reinforcement Layer

Manufacture of the axial reinforcement layer begins with the reinforcing feedstock. In some embodiments, the reinforcing feedstock comprises micro-rope filaments which are bound together longitudinally with EVA or similar resin to create a sheet fabric. This fabric is manufactured to the correct width and stored on one or more feedstock spools for the manufacturing process.

During the manufacturing process the micro-rope generated filaments retracts off the applicator storage spools, is aligned and then draped over the sealing layer, tensioned, and secured by the subsequent hoop reinforcement to produce a circumferential layer of axial reinforcement in the tubular composite structure.

Upon full encapsulation of the plastic cylinder circumference the axial reinforcement filaments are pulled into slight tension to assure that all wrinkles are eliminated and that all reinforcement fibers—micro-ropes—are in appropriate orientation relative to the sealing layer tubular structure. Upon completion of this process the axial reinforcement filaments are secured to the sealing layer by the subsequent application of the hoop reinforcement windings.

Manufacture of Hoop Reinforcement Layer

With the axial reinforcement layer material fully incorporated into the tubular assembly and the sensor array layer installed, the next application in the automated manufacturing process is the installation of one or more hoop reinforcement layers. This layer is comprised of high strength carbon fiber micro-rope filament reinforcement radially wound over the sensor array layer and axial reinforcement layer.

The tubular structure is propelled along the fixed or articulating mandrel while proceeding through the center of the external winder machine.

The filament feedstock is stored on an array of spools that are oriented and affixed to the OD of the orbiting filament winding machine. This machine is open in center allowing for passage of the forming mandrel and the tubular assembly during the manufacturing process.

By example, the maximum speed of the hoop reinforcement winding may be able to facilitate orbital winding of the tubular structure along the forming mandrel at traversing speeds of 25 ft./min based on diameter and reinforcement amount.

Orbital motion of the winding machine combines with the traverse of the tubular structure to form a helical structure for the axial reinforcement layer. The winder machine is automated and electromechanically controlled for orbiting speed based on the traversing speed of the tubular structure along the forming mandrel, filament tension, and pitch. As the tubular assembly traverses down the forming mandrel, the orbiting fixture winds the hoop reinforcement filament onto the tubular assembly in a helical orientation. The hoop reinforcement filament will be generally applied so that there is no gap between individual filaments, depending on the manufacturing specification, design, and composition/thickness of the sealing layer material. Upon completion of this winding process, the tubular assembly travels on the forming mandrel under a phase array sensor to assure proper pitch and to record pitch data for historical record as with all other manufacturing processes.

Multiple hoop reinforcement winders may be located along the manufacturing "line", providing identical functionality as the first orbital winder. The additional winders can provide manufacturing redundancy to facilitate reloading of storage spools, or to work around mechanical failure of a single winder. The additional winders can also provide contra-helical wraps of reinforcement, which can afford more uniformly distributed loading on application of strain to the TCS from internal pressure.

The winding and application equipment can be compartmentalized and positionally interchangeable, in order to readily change the order of layers or to add additional or specialized layers to the tubular assembly. To increase the storage capacity and winding speed of the radial winder, it will have multiple storage spools incorporated in the orbiting section of the winder.

Incorporation of Sensor Array Layer

One or more sensor array layers may be applied over any of the tubular assembly layers and/or internally incorporated onto the internal surface of the sealing layer, depending on project specification. In some embodiments, a sensory array layer is helically oriented around the axial reinforcement layer. In some embodiments, a sensory array layer is helically oriented around the hoop reinforcement layer. The sensor array layer can also be installed in either a longitudinal or helical orientation on the tubular assembly. The sensor array layer feedstock can be stored on one or more spools mounted on an orbiting fixture. This fixture is open in center allowing for passage of the forming mandrel and the tubular assembly for passage through during the manufacturing process. The sensor array layer most typically will be installed in a helical orientation; however, in some applications, a sensor array layer may be installed along the longitudinal axis of the tubular assembly. As the tubular assembly traverses down the mandrel, the orbiting fixture winds the sensor array onto the axial or hoop reinforcement layer. Alternatively, the orbiting fixture can remain stationary for installation of the sensor array layer in an axial orientation along the tubular assembly.

Manufacture of Protective Layer

Upon completion of the hoop reinforcement layer installation the tubular assembly traverses further along the forming mandrel into the protective layer installation segment of the mandrel manufacturing process. In this process a band of protective material is helically wrapped around the surface of the hoop reinforcement layer. This layer provides protection of both the hoop reinforcement layer filaments and the sensor array layer during the installation process. The protective layer feedstock is stored on an array of spools that are oriented and affixed to the outside diameter of the orbiting filament installation fixture. This fixture is open in center allowing for passage of the forming mandrel and the tubular assembly for passage through during the manufacturing process. As the tubular assembly traverses down the mandrel, the orbiting fixture winds the protective layer onto the hoop reinforcement layer.

For protective layer formulations that include materials such as polyolefin and PET, an optional tension/compression process can be incorporated at this point. Once the protective layer is fully wrapped onto the hoop reinforcement layer the tubular assembly traverses through a heating element such as an autoclave to slightly shrink and tension the protective layer over the underlying layers. This tension/compression process affords confinement and retention of the underlying layers in their proper design orientations during the push/pull installation or appointment process. This material compression will assist in maintaining the specific orientation of the layers below during the pull-in-place installation process therefore, assuring the alignment required for the previous layers to provide the structural resistance as designed. This compressive process of the protective layer also adds increased buckling resistance to the tubular composite structure by increasing the cohesive strength of the layers.

Incorporation of Over-Mold

For both the pipeline renewal and coiled storage usages disclosed herein, either the protective layer or the hoop reinforcement layer can be autonomously wrapped with pre-impregnated carbon fiber tape or over-molded with a high-build rigid thermoplastic thermal spray process as the tubular assembly exits the forming mandrel. Specific to coiled storage usages, this iteration in the manufacturing process will provide for a TCS without forming of the plastic sheet stock over the first tubular assembly layer, or the need to insert one tubular structure into the second tubular structure as is performed in the pipeline renewal and standalone usages disclosed herein. Either the protective layer or the hoop reinforcement layer is coated with a thick film of plastic using thermal spray to provide the second sealing layer, thus obviating the need to encase the tubular assembly with plastic sheet stock. Once this second sealing layer is applied, second layers of axial reinforcement and hoop reinforcement would be installed over this over-mold coating in the same manner as in the typical manufacturing of a tubular assembly. The iteration allows for application of the second layer of the binary composite via an over-mold coating rather than the formation of thermoplastic over the first layer. The over-mold coating is performing as the sealing layer in these applications. Additionally, a final over-mold coating can be applied to the exterior of the tubular assembly for a variety of functions, including but not limited to redundant fireproofing, insulation, and puncture resistance. This iteration will also be instituted in in very deep subsea and underwater installations or other installations where the design requires extreme buckling resistance to external loading.

This protective layer may also consist of applying an over-mold of carbon fiber, Kevlar, aramid, or fiberglass fabric that has been impregnated with a UV or heat cured resin. This protective over-mold would be used on systems requiring additional buckling resistance such as standalone liner or coil storage usages. The internal and external over-mold layer can be applied at thicknesses of 0.10 inch to 1 inch and potentially higher thicknesses where increased buckling, bending or media resistance is required. The over-mold also provides protection from puncture, damage, vandalism or terroristic damage of the liner system when installed above ground for coil or elevated pipe systems. In some embodiments, the over-mold protective layer is applied along the forming mandrel. In some embodiments, the over-mold protective layer is applied remote from the forming mandrel, in proximity to the host pipe entrance. This remote application will allow for the liner to be manufactured on the forming mandrel and retain the flexibility to bend as it maneuvers towards the host pipe. Once the liner is in at the same longitudinal axis as the host pipe it would progress through the over-mold layer equipment for application of the curable fabric and then cured prior to entering the host pipe.

Upon exiting this last manufacturing process, the tubular assembly continues to traverse along the forming mandrel thus releasing the tubular assembly from the end of the mandrel and allowing it to progress the host pipe access.

Incorporation of Specialty Coating

This embodiment affords the capability to apply traditional highly resistant thermoset coatings, thermal flame spray, austenitic metal and other metal coatings or films 360 degrees on ID of the sealing layer for future contact with the transmission media.

This methodology utilizes established methods for fixed solid-state particle deposition in the interspatial area of the forming mandrel in the automated manufacturing process.

Also disclosed herein are methods comprising the application of "cold spray" metalizing process or thermoset coating process for specialized installations on the OD of the final tubular assembly and/or encapsulating the inner surface of one or all the sealing layers of the individual tubular composite structures a coating or film on the innermost and outermost surfaces of the final TCS and/or one of multiple layers in between. The traditional, thermal and metalizing process is completed remotely via an affixed and suspended appendage and radial dispersion fixture or nozzle at the internal centerline of the forming mandrel fixture as part of the automated onsite manufacturing process. This internal radial dispersion fixture can also be used to apply other highly specialized coatings to the inner diameter of the sealing layer for specialized installations. In the pipeline renewal usages disclosed herein, the application of coatings is the final material application after the final tubular assembly departs the forming mandrel in the automated manufacturing process prior to final phase array flaw detection for quality control and the tubular assembly being pulled into the pipeline or being deposited as a standalone pipeline structure. In the methods for coil storage embodiment as disclosed herein, this coating process may be performed prior to or after the tubular assembly exits the articulating mandrel.

Binary Tubular Composite Structure ("BTCS")

Certain methods disclosed herein can provide two or more composite cylinders through the repeated insertion of tubular assemblies of consecutively smaller diameters. This embodiment would most often be used in large diameter host pipelines with ultra-high internal pressure and/or requiring increased buckling resistance such as subsea installations and/or for increased insulative qualities for liquid hydrogen transmission.

In some embodiments, the following binary tubular composite structure ("BTCS") can be utilized: a first tubular assembly (henceforth identified as tubular assembly #1) completely enclosing a second tubular assembly (henceforth identified as tubular assembly #2), with the outer diameter of tubular assembly #2 being smaller than or equal to the inner diameter of tubular assembly #1. In some embodiments, the outer diameter of tubular assembly #2 is equal to the inner diameter of tubular assembly #1. In some embodiments, the outer diameter of tubular assembly #2 is marginally smaller than the inner diameter of tubular assembly #1. In some embodiments, the outer diameter of tubular assembly #2 is about 98% of the inner diameter of tubular assembly #1. In some embodiments, the outer diameter of tubular assembly #2 is about 95% of the inner diameter of tubular assembly #1. In some embodiments, the outer diameter of tubular assembly #2 is about 90% of the inner diameter of tubular assembly #1. In some embodiments, the outer diameter of tubular assembly #2 is about 85% of the inner diameter of tubular assembly #1. In some embodiments, the outer diameter of tubular assembly #2 is about 80% of the inner diameter of tubular assembly #1.

Each of the two tubular assemblies can be manufactured using the methods disclosed herein. Various methods can be used to combine the two tubular assemblies, and thus form the BTCS. In some embodiments, tubular assembly #1 and tubular assembly #2 are assembled separately, then the tubular assembly #2 is inserted into the interior of tubular assembly #1. In some embodiments, tubular assembly #1 is completely assembled, then tubular assembly #2, assembled previous to, concurrent with, or after assembly of tubular assembly #1, is inserted into the interior of tubular assembly #1. In some embodiments, tubular assembly #1 is completely assembled and positioned in its intended location, then tubular assembly #2, assembled previous to, concurrent with, or after assembly of tubular assembly #1, is inserted into the interior of tubular assembly #1. In some embodiments, tubular assembly #1 is completely assembled and positioned in its intended location within a host pipe, then tubular assembly #2, assembled previous to, concurrent with, or after assembly of tubular assembly #1, is inserted into the interior of tubular assembly #1.

It should be noted that the action of inserting tubular assembly #2 into the interior of tubular assembly #1, as described above, is intended only to indicate the relative motion of the two tubular assemblies. In some embodiments, tubular assembly #1 is essentially stationary, while tubular assembly #2 is moved to within tubular assembly #1, thus accomplishing the insertion. In some embodiments, tubular assembly #2 is essentially stationary, while tubular assembly #1 is moved to envelop tubular assembly #2, thus accomplishing the insertion. Both modes of insertion, and all intermediate modes, i.e., simultaneous motion of both tubular assembly #1 and tubular assembly #2, are contemplated by this disclosure.

In some embodiments, tubular assembly #1 and tubular assembly #2 are assembled concurrently. In some embodiments, tubular assembly #1 and tubular assembly #2 are assembled at least partially concurrently: stated differently, assembly of one tube is not yet complete upon initiation of assembly of the other tube.

In some embodiments, tubular assembly #2 is completely assembled, and the outer surface of tubular assembly #2 acts as the mandrel for assembly of tubular assembly #1. For these embodiments, one end of tubular assembly #2 is fed into an assembly mechanism, which performs the various steps of manufacturing a TCS, described above, on the outer surface of tubular assembly #2, rather than on a mandrel. It will be appreciated that this method is best suited for manufacture of a BTCS for which the outer diameter of tubular assembly #2 is equal to the inner diameter of tubular assembly #1. In some embodiments, assembly of tubular assembly #2 is initiated, then after a period of time, the newly formed end of tubular assembly #2 is fed into the assembly mechanism for assembling tubular assembly #1.

All BTCS structures, except those structures for which the diameter of tubular assembly #2 is equal to the diameter of tubular assembly #1, will contain an interspatial annular cylinder between the innermost surface of tubular assembly #1 and the outermost surface of tubular assembly #1. In some embodiments, this interspatial annular cylinder is left unfilled. In some embodiments, this interspatial annular cylinder has been filled with material. In some embodiments, this interspatial annular cylinder has been filled with flowable, and optionally curable, material. In some embodiments, this interspatial annular cylinder has been filled with flowable and curable material. In some embodiments, this interspatial annular cylinder has been filled with flowable and curable, material, and the flowable and curable material has been cured subsequent to filling the interspatial annular cylinder.

Structures containing 3, 4, and 5 or more concentric tubular assemblies are also within the scope of this disclosure. It will be appreciated that, depending on the inner and outer diameters of the various tubular assemblies, one or more interspatial annular cylinders can exist between adjacent concentric tubular assemblies.

In some embodiments, the interspatial annular cylinders are left unfilled. In some embodiments, one or more interspatial annular cylinders are left unfilled. In some embodiments, one or more interspatial annular cylinders are filled with material. In some embodiments, the interspatial annular cylinders have been filled with material. The material used to fill individual interspatial annular cylinders can be the same or different. In some embodiments, an interspatial annular cylinder has been filled with flowable, and optionally curable, material. In some embodiments, an interspatial annular cylinder has been filled with flowable and curable material. In some embodiments, an interspatial annular cylinder has been filled with flowable and curable, material, and the flowable and curable material has been cured subsequent to filling the interspatial annular cylinder.

It will also be appreciated that manufacture of structures containing 3, 4, and 5 or more concentric tubular assemblies can be accomplished by combination of steps outlined for the BTCS. By way of example only, a ternary structure, containing 3 concentric tubular assemblies, can be obtained by the step of: (a) inserting a tubular assembly #2, having outer diameter smaller than the inner diameter of a tubular assembly #1, into the tubular assembly #1, followed by the step of: (b) inserting a tubular assembly #3, having outer diameter smaller than the inner diameter of the tubular assembly #2, into the tubular assembly #2.

For standalone usages, the following BTCS can be utilized: one tubular assembly with marginally lesser OD is inserted into another tubular assembly of marginally greater ID, to provide a BTCS. These tubular composite structures can each be made with one or multiple layers for sealing, reinforcement, sensing, and rupture/leak prevention.

For pipeline renewal usages, an additional interspatial annular cylinder is formed between the OD of the TCS and the internal diameter of the host pipe.

Mobile Onsite Factory

The field installation of the tubular composite structure shall be completed with the utilization of a mobile onsite factory ("MOF") which will significantly increase the effectiveness, efficiency, and precision of the manufactured TCS system. The mobility and versatility of MOF allows its precise positioning to the host pipe insertion access, as well as the rapid mobilization to subsequent pipeline accesses. Furthermore, it can facilitate TCS installation in rugged environments such as steep mountainous slopes or wetlands, and can be loaded on barges for extended subsea, lake and river installations. In short, it can provide TCS installation in areas not accessible with current technology.

Just as importantly, compared to current technologies, the MOF will afford the TCS installation process require a substantially smaller jobsite and a significantly reduced carbon footprint. The MOF's automated manufacturing equipment can be permanently housed in a customized intermodal container to allow for the transporting of the mobile factory on a flatbed trailer to and from jobsites. The MOF can then be affixed to a track drive carrier (TDC) unit. The MOF and TDC units can be powered by rechargeable batteries for all drive train mechanics, steering systems, and hydraulic systems, and can possess solar power systems for all incidental low current power needs such as lights and power outlets. The internally contained automation machinery for TCS manufacturing can be hydro powered with a turbine generator or can be powered with conventional hydrocarbon feedstocks (optionally utilizing the media flow from bypass piping in hot tapping/line stopping mode), or by a combination of the two. Additionally, when applicable all remote ancillary installation equipment such as winches, forklifts and other material handling equipment can be battery powered.

Once the MOF is driven to the jobsite or if offloaded on jobsite it can be affixed to the TDC and driven to and positioned at the first pipeline access. The MOF can have the static (non-expanded) capability of manufacturing TCSs from 4" diameter to 18" diameter and the dynamic hydraulic actuated (expanded) width to facilitate the introduction of feedstock for production of TCSs 20" in diameter or greater. The MOF shall incorporate HVAC environmental systems for specified application parameters and the manufacture of TCSs for inclement weather conditions.

During the described installation process, the onsite automated tubular assembly manufacturing process in the MOF is operating to produce the tubular assembly as it is being pulled and/or pushed into the pipe. This manufacturing process commences with the loading of two spools of feedstock into the mounted mechanical fixtures. These fixtures or cradles afford motorized rotation of the feedstock spool into the MOF automated tubular assembly manufacturing system. The mechanical rotation of the spools is PLC/PC interfaced and precisely synchronized for linear feed speed with all other automated manufacturing processes and tubular assembly advancement and installation mechanics.

Manufacture of the tubular assembly begins with the sealing layer material, loaded onto one or more feedstock spools. Depending on the host pipe diameter, the feedstock material may be wound on the spool as sequential full width layers or multiple overlapped narrow layers spiraled across the width of the spool and then sequentially layered to stack up to the OD capacity of the spool. The determination for the size of the feedstock spools is based on such factors as host pipe diameter, sealing layer thickness and shipping constraints. In some embodiments, the sealing layer material is loaded onto two or more feedstock spools. In this manner, a second spool, containing additional sealing layer material, can be brought into service for manufacture, once the material on the first spool has been consumed. In this matter, down time due to resupply operations can be kept to a minimum.

Methods for Pipe Renewal

Pipe renewal can comprise a step of identifying a segment of host pipe for renewal, and identifying an insertion end for this segment, at which location the TCS will be inserted into the host pipe, and at which end an MOF can be located. The length of this segment can be as short as a couple hundred feet, or as long as 15 miles, or any length in between, depending on host pipe diameter and clear length of pipeline, i.e. without valves or other impediments to the lining process.

Pipe renewal with TCS containing two or more tubular assemblies will typically be accomplished by insertion of successive tubular assemblies, beginning with the outermost tubular assembly. Pipe renewal with BTCS will therefore typically be accomplished by insertion of tubular assembly #1, followed by tubular assembly #2.

In certain embodiments, particularly for pipelines with low internal pressure or specific gravity pipelines such as natural gas, potable water distribution and sewer force main applications or as a single-layer storage system, the TCS contains a single tubular assembly. In certain embodiments, especially for higher pressure lines (e.g., in excess of 3,000 psi), lines carrying particularly flammable, explosive, or hazardous materials, and lines in sensitive areas requiring extra leak protection, the TCS is installed as a binary system, i.e., a binary tubular composite structure ("BTCS"), containing two concentric tubular assemblies.

In order to gain access to the interior of the host pipe, one or two lengths of host pipe, termed "pups", at one or both ends of the pipe segment, are identified for removal.

Certain methods described herein require only a pushing action for insertion of the tubular assembly into the host pipe. These methods can require removal of only a single pup, located on the insertion end of the pipe segment. This pup is preferably at the upstream end of the pipe segment, in order for the flowing action of the medium to enhance traversal of the tubular assembly, as described below.

Certain methods described herein employ a pulling action for traversal of the tubular assembly into the host pipe. These methods further require a second pup, located at the opposite end of the pipe segment, henceforth termed the "winch end".

In some embodiments, the pup is approximately 3 linear feet, in order to provide adequate access to the host pipe. Pups of different lengths may be chosen in some embodiments, including but not limited to pup lengths of 4 feet, 6 feet, 8 feet, 10 feet, and 15 feet. A similar length can be chosen if a valve, short radius bend or other fixture is removed as part of the renewal specification.

Hot Tapping/Line Stopping

In some embodiments, the pipe renewal process is undertaken after shutdown of media flow through the host pipe. The methods and manufactures disclosed herein provide the option of hot tapping/line stopping the host pipe.

Hot tapping/line stopping is a process wherein a small section of pipeline can be removed without interrupting its flow. The process involves known and specialized equipment and hot tap/line stop fixtures that are clamped or welded at two different points in the pipeline, allowing diversion of media flows away from the span between these two points, and providing access to that span of pipeline while maintaining an uninterrupted flow of media throughout the entire process. The medium can flow, in full or in part, through a conduit attached to the pipeline outside of either end of the span.

In some embodiments, particularly for renewals of long spans of pipes, a pressure/flow amplifier or a pump can be installed in a conduit, in order to maintain adequate flow through the pipe segment.

In some embodiments, the diameter of a TCS is chosen so as to maintain suitable flow and pressure within the pipe segment while undergoing pipe renewal.

The tubular composite structures disclosed herein represent a major improvement over all current pipeline renewal technologies specific to natural gas distribution pipelines, more so than potable water or other distribution pipelines. The capability to renew natural gas pipelines while in service is as important for human safety as it is for mitigating customer inconvenience. The obstruction or stoppage of natural gas flow to furnaces, ovens and other residential and commercial appliances can result in explosive consequence, especially in appliances that are old or not in compliance with current operational and safety codes.

By example when gas is interrupted, a furnace pilot light is extinguished. When gas flow is reinstated, it can migrate into the structure, thus creating a potentially explosive environment. Also, on many antiquated or potentially faulty systems, once gas flow is interrupted, the pilot light must be manually lit upon reinstatement of gas flow. The potential for human error in this task is cause for additional concern.

A straightforward calculation can demonstrate the feasibility of a hot tapping/line stopping TCS installation in a typical natural gas pipeline system. Typically, the pressure to service connections in such a system is well under 10 psi, and an average household or business typically requires about 10 cubic feet of natural gas per hour to operate. The volume of gas required to supply the average home or business in a 12-inch gas distribution pipeline is only 2.5 linear feet of pipe capacity in usage per hour, corresponding to 36 linear feet of pipe per 24 hours. In light of installation rates of up to 40 feet per minute for the tubular composite structure, and the low pressure and volumetric requirements to operate homes and business during installation, the required gas flow to services is easily obtained via the provided interspatial conduit. This described capability of the tubular composite structure represents a significant improvement over all other current pipeline renewal systems, which require the host pipe to be taken out of service during the installation process.

During the installation process, the interspatial annular cylinder is temporarily utilized as a conduit for the medium to continue to flow to the service connections for homes and businesses on the pipeline, as well as to any routing tees in the pipeline. The medium flows through the interspatial annular cylinder during installation, allowing for the medium to flow over and around the exterior surface of the tubular assembly as it is being installed providing continued flow to all the service laterals along the pipeline. This procedure is described in more detail in the installation narrative below.

In the pipe renewal usage disclosed herein, the points of attachment for the hot tap/line stop fixtures are located outside of the pup intended for removal. For example, removal of a 3-foot long pup with hot tapping can be accomplished by locating hot tap/line stop fixtures at either end and to the exterior of the pup, and approximately 6 to 8 feet apart. The distance between hot tap/line stop fixtures can be determined by several factors particular to the pipe renewal project.

In certain embodiments, the hot tap/line stop fixture contains two separate mechanisms. In these embodiments, the line stop mechanisms are placed interior to the hot tap mechanisms, so that media can flow through the conduit attached to the hot tap mechanisms while sealing off the length of pipe containing the pup at the line stop mechanisms.

In certain embodiments, the hot tap/line stop fixture is a single mechanism, providing functionality both for diverting for diverting media flow into a conduit, and for stopping the flow of media in the pipeline. For these embodiments, the two hot tap/line stop fixtures are oriented so that the line stop functionality to the interior of both fixtures, i.e., on the side of the pup, so that media can flow through the conduit attached to the fixture while sealing off the length of pipe containing the pup.

The two fixtures are secured to the host pipe, and a flow bypass conduit is connected between the fixtures.

Relief valves are installed to the interior of both fixtures, and to the exterior of the pup. Installation can be achieved with any method known in the art, including but not limited to welding. Upon verification of seals, the host pipe is drilled through the hot tap fixture, and temporary remotely controlled plugs are inserted through the fixture and into the pipeline. Upon inflation of the plugs, the normal flow of the pipeline media is temporarily bypassed through the conduit connected to each fixture, thus allowing for uninterrupted flow through the pipeline. Once this process is completed, the relief valves are opened, allowing for the evacuation of any pressure in the pipe section between the hot tap fixtures. The pipeline is then cut, and the pup is removed. Once removed, flanges can be welded onto the ends of the host pipe for post lining insertion of a flanged pipe spool. Alternatively, tensile restrained compression fittings can be installed to the pipe ends, for securing a short section of replacement pipe in the area where the pup was removed.

Sealing Flanges

Upon completion of the hot tapping process and pup removal, a specialty sealing flange is secured to the insertion end of the host pipe opening. The specialized sealing flange disclosed herein allows traversal of the tubular composite structure down the host pipe without pressurized media leaking back into the outside atmosphere. This specialized sealing flange thus allows for pipeline renewal without interrupting the flow of the pipeline. In such applications this annular space, which acts as a circumferential conduit, may be made larger if required by decreasing the diameter of the tubular composite structure's OD.

For methods that require both pushing action and pulling action for traversal of a tubular assembly into the host pipe, a winch is located at the winch end of the pipeline. Preferably, the winch end is at the downstream end of the pipe segment. In certain embodiments, the winch system has the capacity to hold 20 miles of high tensile plasma rope for pulling of the tubular composite structure into the host pipe. The plasma rope can be threaded through the pipe segment with the aid of either an autonomous tractor robot or a pipe kite, which utilizes the existing media flow through the pipeline to propel or vacuum the kite from one access to the next. Either of the autonomous tractor robot or pipe kite pulls a thin high tensile string, which is retrieved at the second pup and connected to the plasma rope, which is then pulled through the host pipe to the insertion end of the host pipe. Upon completion of this process, the plasma rope is pulled through the sealing flange at the insertion end. The plasma rope can then be tied off to an immobile object so that it is not accidentally pulled back into the host pipe.

Once all automated manufacturing and insertion systems have been calibrated for precise speed control, the lining manufacturing process and installation process begins. The tubular assembly continues to be pushed over the forming mandrel as it is being pulled into the pipe at a set and precisely synchronized speed between pushing, manufacturing, and pulling of the tubular composite structure into the host pipe.

Upon exiting the forming mandrel, the leading end of the tubular assembly is fitted with a pulling plug, which attaches securely to the tubular assembly. In some embodiments, the pulling plug is inserted into the inner diameter of the tubular assembly. The particular design of the pulling plug depends on both the diameter and mass of the tubular assembly system to be inserted. In some embodiments, the diameter of the pulling plug is between 6 inches and 48 inches. The pulling plug can further comprise a series of radial ridges that lock into the tubular assembly when mechanically expanded.

In certain embodiments, the pulling plug interfaces with and attaches to axial reinforcement micro-rope filaments that are incorporated into the liner during manufacturing. In these embodiments, tensile strain exerted on the liner while being pulled into the host pipe is applied to these axial filaments, therein eliminating the potential for any axial loading on the other liner components, and more specifically eliminating the potential for buckling or tearing.

The pulling plug can also house one or more wireless cameras for real time monitoring the leading end of the tubular assembly while it traverses the host pipe. Additionally, the operator can be provided a visual on the positioning of the leading edge to align the tubular assembly on critical stopping points such as terminations.

In certain embodiments, the pulling plug has a conical shape, in order to transition the tubular assembly over any profiles in the host line, such as weld seams or offsets.

In certain embodiments, the pulling plug comprises sealing surfaces that form intrinsic seals on the inner diameter of the host pipeline.

In embodiments that employ a plasma rope for pulling, the pulling plug has a barrel swivel and shackle for attachment to the plasma rope.

With some applications such as those with multiple bends, the tubular assembly can be pushed into the host pipe to reduce capstan effects and to offer greater precision on tubular assembly positioning. In some embodiments, the tubular assembly is pushed forward in the host tube with a pushing mechanism, which comprises a series of track drives with high grip belts that compress on the exterior of the tubular assembly and propel it forward or reverse. This pushing mechanism is also calibrated and synchronized on the same wireless network as the automated manufacturing equipment and the pulling winch.

The pulling plug is then inserted into the insertion end of the pipe segment, through the sealing flange. Media continues to flow through the interspatial annular cylinder throughout the entire installation process, thus allowing the host pipeline to remain in service.

In certain embodiments, the pipe can be pushed forward with the assistance of the media in the pipeline. Media is diverted in part from the hot tapping fixtures to interior of the forming mandrel. A multi-stage convex seal affixed to the very end of the forming mandrel's OD seals the small annulus between the forming mandrel OD and the completed liner's ID. This seal eliminates all potential for the media to exhaust/leak at this interface. The pressurized medium then fills the liner system, thus pressurizing the liner and physically propelling or "pushing" the liner forward through the host pipe.

In certain embodiments, a series of DAQ controlled friction roller assemblies, in constant contact with the OD of the completed liner near the end of the mandrel, can further control the speed of insertion. In these embodiments, the friction roller assembly simply uses dynamic friction to arrest all potential for the "pushing" force to propel the liner faster than the preset installation speed of the winch.

In certain embodiments, the pulling plug can also comprise a pressure regulator/relief valve. In these embodiments, bleed of media through the valve can further control the traversal speed of the insert, and can further modulate the flow of media through the entire host pipe, and thus maintain services from the pipeline, and adjust flow as needed, due to fluctuating demand of media.

In certain embodiments, the installation rate of the liner into the host pipe is dominantly controlled by the pulling speed of the winch.

In certain embodiments, traversal of the tubular assembly is accomplished solely by pushing. In these embodiments, the winch and plasma rope are not required, nor is removal of the second pup required. This mode may be used for projects where there is not time to provide a second access, or a second access is not available or feasible and the liner must be installed for an emergency repair.

In certain embodiments, installation of a binary tubular composite structure ("BTCS") is performed with the following steps. The outer tubular assembly ("tubular assembly #1") is inserted into the pipe segment using the methods described above. Concurrent or subsequent to its fabrication, the inner tubular assembly ("tubular assembly #2") is inserted into the interior of tubular assembly #1, again using methods described above. The ends of tubular assembly #1 and tubular assembly #2 are aligned if needed.

After installation of the TCS is complete, the media flow is redirected by way of the hot tap/line stop bypass system through both the interspatial annular cylinder conduit and through the flow area of newly installed TCS system. This redirection allows installation of small sealing plugs at each end of the TCS so that terminations and service connection top hats, described below, can be installed. The redirection also maintains supply to all service connections with media from both the interspatial annular cylinder and the TCS, once each service lateral is reinstated.

Connection of the TCS channel to the service laterals can be made through the use of a device termed a top hat, which is a small tube with an OD that is slightly smaller than the ID of the service connection piping. The tube part of the top hat is at least as long to pass from the ID of the TCS to the ID of the host pipe. The "hat" or tee part of the top hat is circular shaped piece of material that is pre-molded to have a curvature similar to that of the ID of the TCS. This geometry assures that when inserted, it seals tightly on the TCS material. Pressure sensitive adhesive can be applied to the top hat surfaces before insertion to temporarily hold the top hat in place until the final anchoring is completed with the injection of the flowable material into the interspatial annular cylinder, described below.

Completion of each service connection is accomplished by remotely providing a channel from the TCS to the service lateral. Once this process is complete, media from the interspatial annular cylinder no longer flows to the lateral. In its place, the entirety of the flow to the lateral is provided from the interior of the TCS.

This process can be accomplished by a lateral cutter robot, which is remotely guided down the TCS. The cutter robot can utilize a UT sensor to locate the void behind the TCS due to the service connection. The exact location of a service lateral can be communicated back to the operator from the lateral cutter robot Wi-Fi system. This allows for highly precise location and boring of the TCS wall to expose the service connection opening.

The lateral cutter robot then cuts an opening through the TCS at the interface. The removed core plug is moved to an onboard creel for storage. An electromechanically actuated and articulating arm on the robot can then remove a top hat from the onboard depot and insert it into the TCS core opening and into the service lateral, followed by compressing the top hat to assure full insertion as well as the required bonding of the pressure sensitive adhesive to the TCS wall. The control functionalities and visual task confirmation of the lateral cutter robot are communicated via 360 degree looking wireless cameras to verify proper installation. This process is completed for all service connections in the newly lined host pipe. Once this scope of work is complete, the lateral cutter robot is retracted through the sealing attachment at either end.

Upon completion of the tubular composite structure insertion process, terminations are installed to one or both ends of the TCS.

These terminations can be completed either manually or with a semi-autonomous or autonomous robotic device depending on the proximity of access to the termination of the TCS. The purpose of the termination of the TCS is to permanently seal the interspatial annular cylinders from any potential infiltration of future pressurized media. Preferably, these terminations are made of steel mechanical fittings or carbon fiber wraps, or from supersonic particle deposition of metalized powder. In some embodiments, these terminations comprise a carbon fiber seal, which undergoes snap cure.

One or more high flow check valve ports are installed at the cross-sectional centerline of the interspatial annular cylinder created between the TCS and the host pipe.

For embodiments that utilize BTCS structures, comprising an interspatial annular cylinder, one or more high flow check valve ports are installed at the cross-sectional centerline to the interspatial annular cylinder created between tubular assembly #1 and tubular assembly #2.

Upon completion of the injection, pressurization, and snap cure process, the pipe pups or, in their place, tensile restrained couplers, are installed at the access points to close the pipe. The pipeline is reinstated for full service, and the hot tapping/line stopping equipment is removed from the pipeline.

Injection of Flowable Material

Further disclosed herein are methods to inject flowable and curable material into interspatial annular cylinders. As described above, binary tubular composite structures can contain an interspatial annular cylinder between the innermost surface of tubular assembly #1 and the outermost surface of tubular assembly #2. Tubular composite structures containing 3, 4, and 5 or more concentric tubular assemblies can contain one or more interspatial annular cylinders between adjacent concentric tubular assemblies. For pipeline renewal usages, an interspatial annular cylinder is formed between the OD of the TCS and the internal diameter of the host pipe. Methods described below can generally be used for any of these types of interspatial annular cylinders.

In certain embodiments, an interspatial annular cylinder is filled to rejection and pressurized with a flowable and curable material that when cured results in a gelatin like material or ballistic gel. The flowable and curable material may be a two-component formulation, such as acrylamide grout, acrylate grout or approved equal. The flowable and curable material may be chosen from traditional epoxies, polyurethanes, and acrylics. In certain embodiments, the flowable and curable material has low viscosity (100-400 cP). In certain embodiments, the formula for the flowable and curable material can consist of no less than 50% reduced carbon emissions materials and manufacture.

In certain embodiments, the curable material will be pressurized to the maximum buckling resistance of the innermost TCS so as not to collapse it.

In some embodiments, the curable material can be cured using snap cure techniques.

In certain embodiments, the one or more tubular assemblies in the TCS are sealed on the end with mechanical flow through plugs and pressurized to increase the buckling resistance of the structure. This process can be used when the pressure required to fill the interspatial annular cylinder is higher than that of the static buckling resistance of one or more tubular assemblies. Typical applications requiring this scope may include but are not limited to exceptionally long runs of TCS, or significant slopes in the TCS such as in mountainous regions.

The process described can also be utilized for pipeline renewal usages that maintain service in the host pipe, in order to resist the pressure created in the annular space while supplying flow to service connections and/or downstream services.

In certain embodiments, the pressure of the injected liquid will be high enough to assure 100% filling of the interspatial annular cylinder, and encapsulation of all internal boundary surfaces. In certain embodiments for pipeline renewal usages, the pressurization of the flowable, and optionally curable, material in all interspatial annular cylinders encapsulates and seals all lateral intrusions/service connection fixtures, appendages, top hats and terminations so that all potential paths for fluid or gas infiltration/migration behind the TCS system and/or the subsequent causation of hydraulic failure of the TCS system are arrested.

Upon completion of cure of the flowable and curable material, pressurization will be terminated, the ported mechanical seal insert will be removed, and a carbon fiber or cold spray termination is installed. The flowable and curable material, when pressurized, will exfiltrate from the pipe through any cracks, open joints, pinholes etc. in the host pipe. Existing pinholes, cracks etc., in a pipeline over time create voids around the pipe by removing the bedding soils. In some liquid pipelines, this exfiltration of media has created very large sinkholes, leading to collapse of roads and structures in the vicinity of the pipeline. Regardless of the size of the void created around and/or under the pipe, it can destabilize the pipe, as well as create significant bending stresses on the pipe, often leading to pipeline failure. The exfiltration of the flowable and curable material fills these voids, mixes with the bedding soils, and when cured creates new support for the pipeline in these areas, highly mitigating the potential bending stresses and sinkholes. The injection of flowable and curable material, particularly two-component formulations, into these interspatial annular cylinders represents a major improvement over current pipeline renewal technologies.

The intrinsic versatility of the mobile onsite factory couples the low weight and high installation flexibility of the produced TCS system and, unlike all current technologies, can afford the capability of ancillary TCS applications such as segmented TCS systems for transitional or emergency repairs. The MOF has the capability for the onsite manufacturing of individual sleeve systems for the long-term renewal or immediate repair of relatively short segments of pipe between 6 inches and 300 ft. in length. The sleeve systems are pulled into the identified pipe segment by way of a high torque and traction force autonomous robot. The robot has the capability to pull the TCS sleeve into the identified renewal or repair location. The robot also facilitates termination at each end of the sleeve autonomously providing a secure and leak proof sleeve repair system. Furthermore, due to the capability in the onsite manufacturing process emergency repairs can be completed with highly flexible and compressible TCS compositions allowing their passage through valves and other pipeline obstructions. This advantage allows operators to initiate the repair without providing pipe access at another location. By example, the repair sleeve system could be initiated through an existing pig launching system.

Design Considerations

Certain manufactures disclosed herein are compatible with the requirements for an AWWA Class IV pipeline renewal system. Certain manufactures disclosed herein of the TCS system can be used for Class III and Class II lining systems. Class IV structures are termed as fully structural, structurally independent, or standalone, must possess several characteristics. The TCS has a long-term hoop strength which equal to or greater than the MAOP of the pipe to be rehabilitated. This hoop strength is tested independently from the host pipe. The TCS also has long-term resistance to external and live loads and the resistance is independent from the host pipe. The TCS is additionally required to have a short-term hoop strength which equal to or greater than all short-term loads, such as sustained and surge (vacuum and occasional and recurrent surge) pressures and live loads even if these loads are more than the capacity of the host pipe. This hoop strength is tested independently from the host pipe. Class IV linings are sometimes considered to be structurally equivalent to new replacement pipe, although such linings will have markedly different properties in terms of buckling and longitudinal bending resistance than the original host pipe. These linings should be designed with adequate load resistance for all reasonable assumptions of loading conditions independent of the host pipe. By necessity, they will be of smaller internal diameters than the host pipe.

However, their design should also consider practical implications to facilitate the continued service objectives of the host pipe such as the ability to provide to service lines and mains without compromising the hydrostatic integrity of the overall lining system. Class IV linings can also be used in circumstances like those for Class II and III, but their use is essential for host pipes suffering from generalized external corrosion where the mode of pipe failure has been, or is likely to be, longitudinal cracking. The host pipe suffers full loss of hoop strength because of the longitudinal crack. Other catastrophic modes (e.g., spiral cracks, circumferential cracks, a leadite style joint failure blow-out) can also happen on the pipe wall where more TCS structural resistance is required than traditional hole spanning structural resistance.

The tubular composite structure can offer Class II, Class III and even Class IV linings, while a given composite system may be rated as Class IV for MAOP levels up to a threshold value and as a Class II and III system at higher pressures.

Additional Design Considerations: In addition to internal pressure loads, linings are also required to sustain external buckling loads during periods when the host pipe is depressurized, as well as transient and cyclic overpressure and/or vacuum loads. Some lining systems (Classes III and IV) can be designed to offer significant inherent resistance to such external loads, while others (Class II) depend solely on adhesion to the host pipe wall. Inherent resistance to external buckling normally varies with increased lining thickness and hence cost. Care should therefore be taken to ensure that such performance requirements are accurately defined.

The methods and manufactures disclosed herein can addresses the various problems and shortcomings discussed above to meet applicable standards. The tubular composite structure is designed for practice in meeting or exceeding ASTM Standard F2896-11 "Standard Specification for Reinforced Polyethylene Composite Pipe for the Transport of Oil and Gas and Hazardous Liquids", ASTM D2774-20 and compliance with ASME B31.12 and API SPEC 15S and will ballot for future technology focused standards and practices.

Certain methods and manufactures disclosed herein take into consideration all of the applicable working scenarios, determine the required sealing layer material thickness, axial direction reinforcement layer and hoop direction reinforcement layer material strength under each loading condition, then use the maximum thickness and strength combination value of calculus to finalize the design. The following design considerations are inclusive of equations for a multitude of installation environments and/or parameters.

The design strategy for the disclosed methods and manufactures is to consider all the applicable working scenarios and determine the required sealing layer material thickness, axial direction reinforcement layer and hoop direction reinforcement layer material strength under each loading condition, then use the maximum thickness and strength combination value of calculation results to finalize the design. The following design considerations are inclusive of equations for a multitude of installation environments and/or parameters.

It will be appreciated by a person of skill that not all the equations are applicable to each specific project embodiment disclosed herein. The designer will be advised that each project should be examined on case-by-case basis to avoid utilizing these design considerations as "standardized design methodology". Designing for external loading on the TCS system exemplifies this advisory. If the designer can assess or assume that the existing host pipe has a high probability continuing to either fully or partially resist external loading during and after the expected design life of the TCS system, then the designer shall utilize proper equations provided in this design consideration to afford the most cost and time effective solution.

By example, typically pressure pipeline's failure mode is reduction of resistance to internal pressure and leaking caused by corrosion, but the structural resistance to external pressure remains intact.

In this instance the designer shall consider that there is a high probability the pipe will continue to resist soil loads and probably external water loads as well for the design life of the TCS. Therefore, in such instances the designer should reduce or sometimes even eliminate the buckling forces required on the TCS system or in some cases simply decrease the safety factor for external loading. This should be considered by the designer for steel and cast-iron pipes when external corrosion has not been a failure mode of the existing host pipes. These design considerations have been made inclusive of equations and descriptions thereof to facilitate TCS design for any working condition and the designer shall consider all factors on a case-by-case basis for each TCS project. The designer should also consider and note that for economical and/or supply requirements, oil, gas and other conveyance energy liquids and gas transmitted through pipelines are rarely if ever at atmospheric pressure thus providing consideration for reduced TCS buckling resistance. The designer should also consider the age of pipeline system, soils, and compaction thereof when calculating buckling resistance of the TCS.

The TCS design shall consider the TCS movement and thermal stress caused by the fluctuations of TCS working temperature if applicable.

The composite TCS is required to hold the long-term internal pressure, as well as withstand external pressure loads due to groundwater, soil, and live load if applicable and all scenarios are either dependent or independent of the host pipe. The distribution and orientation of reinforcement layers in the composite have a major influence on the overall material strength of the TCS. With respect to orientation, since the major stress on the host pipe is in the hoop direction, the fiber filaments shall be oriented close to the TCS hoop direction as shown in FIG. 1 to maximize the composite strength.

Since the fiber filament winding is applied on top of the axial reinforcement layer (AR) and sealing layer to reinforce the TCS material, the sealing layer material must have enough wall thickness and strength to withstand the bending and shear stresses caused by the fiber constrains and internal pressure on the unreinforced areas of the TCS material. The final entirety of the TCS system can be composed of single or multiple layers of close-fitting composite cylinders depending on the working conditions and design requirements.

Additionally, the TCS sealing material and axial reinforcement layer must also be verified to ensure the TCS has enough strength to withstand the axial stresses caused by pulling force during the installation process, Poisson's ratio effect, and thrust load. If the TCS is unsupported or surrounded with soil but suspended as beam structures, the TCS strength must also be verified for surmounting the bending stress, shear stress, and buckling caused by gravity.

The TCS may have different thicknesses and physical properties due to the type and amount of reinforcement layers. The supplier shall submit design calculations to the designer and owner/operator for review and approval. Suppliers shall submit test results from third-party organization for all materials for the completion of TCS thickness calculus. All calculation inputs shall be equivalent to all corresponding testing data provided by third-party organization.

While the methods and manufactures have described in detail and with reference to specific examples thereof, it will be apparent to one skilled in the art that various changes and modifications can be made therein without departing from the spirit and scope thereof.

What is claimed is:

1. A method for renewing a host pipe, the method comprising:
   fashioning a tubular composite structure comprising at least one tubular assembly, the at least one tubular assembly comprising:
      a sealing layer situated at an innermost portion of the at least one tubular assembly, wherein the sealing layer is fashioned into a cylinder from at least one flat thermoplastic sheet, forming a cylindrical sealing layer,
      an axial reinforcement layer adjacent to the sealing layer,
      an outermost protective layer, and
      one or both of at least one hoop reinforcement layer or at least one sensor array layer; and
   fitting the tubular composite structure within an interior of the host pipe.

2. The method of claim 1, wherein fashioning the tubular composite structure is performed in a field location for renewing the host pipe.

3. The method of claim 2, wherein fashioning the tubular composite structure is performed in a mobile onsite factory (MOF) at the field location.

4. The method of claim 1, wherein the cylindrical sealing layer is plastic.

5. The method of claim 1, wherein the sealing layer is fashioned in a field location for renewing the host pipe.

6. The method of claim 1, wherein fashioning the sealing layer into the cylinder comprises:
   pulling a sheet of feedstock onto a forming mandrel;
   trimming the sheet of feedstock to a desired width;
   forming a bevel on each opposing side of the sheet of feedstock;
   forming the sheet of feedstock into a cylinder, thus positioning the bevels in proximity to each other, to form a lengthwise seam; and
   sealing the lengthwise seam.

7. The method of claim 6, wherein sealing the lengthwise seam is performed using a process selected from fusion, ultrasonic (UT), or welding.

8. The method of claim 1, wherein the axial reinforcement layer comprises a fabric material comprising at least one of unidirectional fiberglass, carbon fiber, aramid fiber, or high-density polyethylene (HDPE).

9. The method of claim 8, further comprising:
   providing the fabric material for the axial reinforcement layer;
   aligning the fabric material over the cylindrical sealing layer;
   draping the fabric material on the cylindrical sealing layer;
   tensioning the fabric material, thus positioning opposite edges of the fabric material in proximity to each other, to form a lengthwise seam; and
   sealing the lengthwise seam by thermal weld.

10. The method of claim 1, wherein the axial reinforcement layer is fashioned on an exterior of the cylindrical sealing layer.

11. The method of claim 10, wherein the at least one hoop reinforcement layer is fashioned on the exterior of the axial reinforcement layer.

12. The method of claim 11, further comprising:
   fashioning a sensor array layer of the at least one sensor array layer on the exterior of the at least one hoop reinforcement layer.

13. The method of claim 11, further comprising:
   fashioning a protective layer on the exterior of the hoop reinforcement layer.

14. The method of claim 13, wherein material of the protective layer is selected from nylon, tear-resistant polytetrafluoroethylene, coated fiberglass fabric, high-density polyethylene (HDPE), or polyethylene.

15. The method of claim 14, further comprising:

propelling a partially constructed tubular assembly enclosed in the at least one hoop reinforcement layer;

helically wrapping the material onto the at least one hoop reinforcement layer; and applying heat to an exterior of the material.

16. The method of claim 10, wherein the at least one hoop reinforcement layer comprises twisted or braided micro-ropes or twisted or braided carbon fiber graphene hybrid micro-ropes.

17. The method of claim 16, further comprising:

mounting material for the at least one hoop reinforcement layer onto a first winding spool;

propelling a partially constructed tubular assembly enclosed in the axial reinforcement layer; and winding the at least one hoop reinforcement layer from the first winding spool onto the axial reinforcement layer.

18. The method of claim 17, further comprising:

mounting material for the at least one hoop reinforcement layer onto a second winding spool; and winding the at least one hoop reinforcement layer from the second winding spool onto the axial reinforcement layer.

19. The method of claim 18, wherein helices of the at least one hoop reinforcement layer from the first and second winding spools are of opposite handedness.

* * * * *